(12) United States Patent
Jin et al.

(10) Patent No.: US 12,433,951 B2
(45) Date of Patent: Oct. 7, 2025

(54) METHODS OF TREATMENT OF NON-SMALL-CELL LUNG CARCINOMA USING TELISOTUZUMAB VEDOTIN

(71) Applicant: AbbVie Manufacturing Management Unlimited Company, Dublin (IE)

(72) Inventors: Janet Yikai Jin, Foster City, CA (US); Philip B. Komarnitsky, Chestnut Hill, MA (US); Mirella Lazarov, Simi Valley, CA (US); Anita Reddy, Pleasanton, CA (US)

(73) Assignee: AbbVie Manufacturing Management Unlimited Company, Dublin (IE)

( * ) Notice: Subject to any disclaimer, the term of this patent is extended or adjusted under 35 U.S.C. 154(b) by 0 days.

(21) Appl. No.: 17/714,724

(22) Filed: Apr. 6, 2022

(65) Prior Publication Data

US 2022/0323597 A1 Oct. 13, 2022

Related U.S. Application Data

(60) Provisional application No. 63/171,571, filed on Apr. 6, 2021, provisional application No. 63/171,536, filed on Apr. 6, 2021.

(51) Int. Cl.
| | |
|---|---|
| *A61P 35/00* | (2006.01) |
| *A61K 31/517* | (2006.01) |
| *A61K 45/06* | (2006.01) |
| *A61K 47/68* | (2017.01) |

(52) U.S. Cl.
CPC ...... *A61K 47/68031* (2023.08); *A61K 31/517* (2013.01); *A61K 45/06* (2013.01); *A61K 47/6849* (2017.08); *A61P 35/00* (2018.01)

(58) Field of Classification Search
CPC ............ A61K 47/6803; A61K 47/6849; A61K 31/517; A61K 45/06
See application file for complete search history.

(56) References Cited

U.S. PATENT DOCUMENTS

| | | |
|---|---|---|
| 10,383,948 B2 | 8/2019 | Allan et al. |
| 10,603,389 B2 | 3/2020 | Allan et al. |
| 2020/0023076 A1 | 1/2020 | Fotin-Mleczek et al. |
| 2020/0215200 A1 | 7/2020 | Allan et al. |

FOREIGN PATENT DOCUMENTS

| | | |
|---|---|---|
| WO | 2009007427 A2 | 1/2009 |
| WO | 2010064089 A1 | 6/2010 |
| WO | 2010069765 A1 | 6/2010 |
| WO | 2011151412 A1 | 12/2011 |
| WO | 2012007280 A1 | 1/2012 |
| WO | 2020065396 A1 | 4/2020 |
| WO | 2021007428 A2 | 1/2021 |

OTHER PUBLICATIONS

Chao et al., Afatinib induces apoptosis in NSCLC without EGFR mutation through Elk-1-mediated suppression of CIP2A, Oncotarget, vol. 6, No. 4, 2164-2179, Publication Date: Dec. 11, 2014 (Year: 2014).*
NCT03539536 (downloaded from https://clinicaltrials.gov/ct2/show/NCT03539536, version of Mar. 12, 2020) (Year: 2020).*
"A Study Evaluating the Safety, Pharmacokinetics (PK), and Preliminary Efficacy of ABBV-399 in Participants With Advanced Solid Tumors" Recurring clinical Study NCT02099058 (2014); 10 pgs.
Camidge, D. R.., et al "Phase I Study of 2- or 3-Week Dosing of Telisotuzumab Vedotin, an Antibody-Drug Conjugate Targeting c-Met, Monotherapy in Patients with Advanced Non-Small Cell, Lung Carcinoma"; Clinical Cancer Research (2018); vol. 27:21, 20 pgs.
Camidge, D. R. et al., Abstract No. MA14.03, "EGFR M+ Subgroup of Phase 1b Study of Telisotuzumab Vedotin (Teliso-V) Plus Erlotinib in c-Met+ Non-Small Cell Lung Cancer"; Journal of Thoracic Oncology (2019); 2 pgs.
Fujiwara, Y. et al., "Phase 1 Study of Telisotuzumab Vedotin in Japanese Patients with Advanced Solid Tumors"; Cancer Med. (2021); vol. 10:7, pp. 2350-2358.
Heist, R.S. et al. c-Met Expression and Response to Telisotuzumab Vedotin (Teliso-V) in Patients with Non-Small Cell Lung Cancer. J Clin Oncol. 2019;37(15 suppl), 4 pgs.
Murakami, H et al. "Preliminary Results of Safety and PK of Telisotuzumab Vedotin (T) in Japanese Patients with Advanced Solid Tumors"; Annals of Oncology (2019); Abstract No. P1-155, 1 pg.
Ocampo, C. et al. Abstract No. P2.01-19 "Phase 2 Study of Telisotuzumab Vedotin (Teliso-V) in Previously Treated C-MET+ Non-Small Cell Lung Cancer"; Trial in Progress. J. Thorac Oncol. (2019); vol. 14:10, pp. S646.
Parikh, A et al., "Pharmacokinetics And Exposure-Response Analyses of Telisotuzumab Vedotin in Patients with Advanced Solid Tumors: Preliminary Phase I Results", Clinical Pharmacology & Therapeutics. 2019; 105(S1):S67. Abstract # PII-085, 1 pg.
Redman, M.W. et al., Biomarker-Driven Therapies for Previously Treated Squamous Non-Small-Cell Lung Cancer (Lung-MAP SWOG S1400): A Biomarker-Driven Master Protocol. Lancet Oncol. (2020); vol. 21:12, pp. 1589-1601.
Redman, M. W. et al., Lung-MAP (SWOG S1400): Design, Implementation, and Lessons Learned From A Biomarker-Driven Master Protocol (BDMP) for Previously-Treated Squamous Lung Cancer (sqNSCLC). J Clin Oncol. (2020); vol. 38(15 Suppl), 3 pgs.
Strickler, J.H. et al., Phase 1 Dose-Escalation And -Expansion Study of Telisotuzumab (ABT-700), An Anti-C-Met Antibody, in Patients with Advanced Solid Tumors. Mol Cancer Ther. (2020); vol. 19:5, pp. 1210-1217.

(Continued)

*Primary Examiner* — Peter J Reddig
*Assistant Examiner* — Cheng Lu
(74) *Attorney, Agent, or Firm* — Fox Rothschild LLP

(57) ABSTRACT

The present disclosure provides improved methods of treatment of NSCLC cancers using telisotuzumab vedotin.

3 Claims, 11 Drawing Sheets
(11 of 11 Drawing Sheet(s) Filed in Color)
Specification includes a Sequence Listing.

(56) References Cited

OTHER PUBLICATIONS

Strickler, J. H. et al., "First-in-Human Phase I, Dose-Escalation and -Expansion Study of Telisotuzumab Vedotin, an Antibody-Drug Conjugate Targeting c-Met, in Patients With Advanced Solid Tumors"; Journal of Clinical Oncology (2018); vol. 36, 12 pgs.
"Study of Telisotuzumab Vedotin (ABBV-399) in Participants With Previously Treated c-Met+ Non-Small Cell Lung Cancer" Recurring Clinical Study NCT03539536 (2018); 8 pgs.
Wang, J. et al., "Anti-C-Met Monoclonal Antibody ABT-700 Breaks Oncogene Addiction in Tumors with MET Amplification"; BMC Cancer (2016); vol. 16:105, 14 pgs.
Wang, J. et al., "ABBV-399, a c-Met Antibody-Drug Conjugate that Targets Both MET-Amplified and c-Met-Overexpressing Tumors, Irrespective of MET Pathway Dependence", Clinical Cancer Research (2016); vol. 23:4; pp. 992-1000.
Yamamoto, N. et al., "Preliminary Results of Safety and Pharmacokinetics of Telisotuzumab Vedotin in Japanese Patients with Advanced Solid Tumors"; Presented at the 60th Annual Meeting of the Japan Lung Cancer Society (JLCS), December (2019), Osaka, Japan, 1 pg.
Camidge et al., "A Phase 1 b Study of Telisotuzumab Vedotin in Combination With Nivolumab in Patients With NSCLC," JTO Clinical and Research Reports, Dec. 4, 2021 (Dec. 4, 2021), vol. 3, Iss. 1, pp. 1-10.
Lim, S. et al., "Patritumab Deruxtecan: Paving the Way for EGFR-TKI-Resistant NSCLC", Cancer Discovery (2022), vol. 12:1, pp. 16-19.
Camidge, D.R. et al., "1414TiP Evaluating Telisotuzumab Vedotin in Combination with Osimertinib in Patients with Advanced Non-Small Cell Lung Cancer: A Phase I/Ib Study Cohort", Annals of Oncology (2020), vol. 31: Suppl.4, p. S894.
Tong, M. et al., "SHR-A1403. A Novel C-Mesenchymal-Epithelial Transition Factor (c-Met) Antibody-Drug Conjugate, Overcomes AZD9291 Resistance in Non-Small Cell Lung Cancer Cells Overexpressing c-Met", Cancer Science (2019), V359ol.:110:1, pp. 3584-3594.
Criscitiello, C. et al., "Antibody-Drug Conjugates in Solid Tumors: a Look into Novel Targets", J. of Hematology & Oncology (2021), vol. 14:1, 18 pgs.
Heeke, S. et al., Critical Assessment in Routine Clinical Practice of Liquid Biopsy for EGFR Status Testing in Non-Small-Cell Lung Cancer: A Single-Laboratory Experience (LPCE, Nice, France). Clinical Lung Study (2020), vol. 21:1, 18 pgs.
Horinouchi, H. et al., 387P Telisotuzumab Vedotin (Teliso-V), in Combination with Osimertinib in Patients with Advanced EFGR-Mutated, c-Met Overexpressing, Non-Small Cell Lung Cancer (NSCLC): Safety and Efficacy Results from Phase Ib Study:, Annals of Oncology (2022), vol. 33:Suppl. 9, Abstract.
ABBVIE Announces U.S. FDA Granted Breakthrough Therapy Designation (BTD) to Telisotuzumab Vedotin (Teliso-V) for Previously Treated Non-Small Cell Lung Cancer, Jan. 4, 2022, Retrieved from the Internet: URL:https://news.abbvie.com/article_print, 2 pgs.

* cited by examiner

| NSCLC Group | N (Total=88) | Responses | ORR (naive estimate) (95% CI) | Posterior Pr(ORR>25%) | ORR (BHM shrinkage estimate) | Posterior Pr(ORR > 25%) with BH model |
|---|---|---|---|---|---|---|
| NSQ EGFR WT c-Met high | 13 | 7 | 53.8% (25, 81) | 98.8% | 53.6% | 98.8% |
| NSQ EGFR WT c-Met int | 24 | 6 | 25.0% (10, 47) | 51.6% | 24.5% | 44.4% |
| NSQ EGFR MU c-Met high | 22 | 4 | 18.2% (5, 40) | 23.7% | 18.0% | 18.9% |
| NSQ EGFR MU c-Met int | 8 | 0 | 0 (-, -) | 2.9% | 3.5% | 0.9% |
| Squamous | 21 | 3 | 14.3% (3, 36) | 12.5% | 14.6% | 9.2% |

FIG. 8A

| NSCLC Cohort | N (Total=88) | Responses | ORR (naive estimate) (95% CI) | Posterior Pr[ORR > 25%] |
|---|---|---|---|---|
| NSQ EGFR WT | 37 | 13 | 35.1% (20,53) | 91.9% |
| NSQ EGFR MU | 30 | 4 | 13.3% (4,31) | 6.3% |
| Squamous | 21 | 3 | 14.3% (3,36) | 12.5% |

FIG. 8B

SEQUENCE LISTING

```
<160> NUMBER OF SEQ ID NOS: 18

<210> SEQ ID NO 1
<211> LENGTH: 10
<212> TYPE: PRT
<213> ORGANISM: Artificial Sequence
<220> FEATURE:
<223> OTHER INFORMATION: Synthetic polypeptide

<400> SEQUENCE: 1

Gly Tyr Ile Phe Thr Ala Tyr Thr Met His
1               5                   10

<210> SEQ ID NO 2
<211> LENGTH: 17
<212> TYPE: PRT
<213> ORGANISM: Artificial Sequence
<220> FEATURE:
<223> OTHER INFORMATION: Synthetic polypeptide

<400> SEQUENCE: 2

Trp Ile Lys Pro Asn Asn Gly Leu Ala Asn Tyr Ala Gln Lys Phe Gln
1               5                   10                  15

Gly
```

<210> SEQ ID NO 3
<211> LENGTH: 9
<212> TYPE: PRT
<213> ORGANISM: Artificial Sequence
<220> FEATURE:
<223> OTHER INFORMATION: Synthetic polypeptide

<400> SEQUENCE: 3

```
Ser Glu Ile Thr Thr Glu Phe Asp Tyr
1               5
```

<210> SEQ ID NO 4
<211> LENGTH: 118
<212> TYPE: PRT
<213> ORGANISM: Artificial Sequence
<220> FEATURE:
<223> OTHER INFORMATION: Synthetic polypeptide

<400> SEQUENCE: 4

```
Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ile Phe Thr Ala Tyr
            20                  25                  30

Thr Met His Trp Val Arg Gln Ala Pro Gly Gln Gly Leu Glu Trp Met
        35                  40                  45

Gly Trp Ile Lys Pro Asn Asn Gly Leu Ala Asn Tyr Ala Gln Lys Phe
    50                  55                  60

Gln Gly Arg Val Thr Met Thr Arg Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Arg Ser Glu Ile Thr Thr Glu Phe Asp Tyr Trp Gly Gln Gly Thr
            100                 105                 110

Leu Val Thr Val Ser Ser
        115
```

<210> SEQ ID NO 5
<211> LENGTH: 445
<212> TYPE: PRT
<213> ORGANISM: Artificial Sequence
<220> FEATURE:
<223> OTHER INFORMATION: Synthetic polypeptide

<400> SEQUENCE: 5

```
Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ile Phe Thr Ala Tyr
            20                  25                  30

Thr Met His Trp Val Arg Gln Ala Pro Gly Gln Gly Leu Glu Trp Met
        35                  40                  45

Gly Trp Ile Lys Pro Asn Asn Gly Leu Ala Asn Tyr Ala Gln Lys Phe
    50                  55                  60

Gln Gly Arg Val Thr Met Thr Arg Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Arg Ser Glu Ile Thr Thr Glu Phe Asp Tyr Trp Gly Gln Gly Thr
            100                 105                 110
```

Leu Val Thr Val Ser Ser Ala Ser Thr Lys Gly Pro Ser Val Phe Pro
            115                 120                 125

Leu Ala Pro Ser Ser Lys Ser Thr Ser Gly Gly Thr Ala Ala Leu Gly
130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Gln Thr Tyr Ile Cys Asn Val Asn His Lys Pro Ser
        195                 200                 205

Asn Thr Lys Val Asp Lys Arg Val Glu Pro Lys Ser Cys Asp Cys His
210                 215                 220

Cys Pro Pro Cys Pro Ala Pro Glu Leu Leu Gly Gly Pro Ser Val Phe
225                 230                 235                 240

Leu Phe Pro Pro Lys Pro Lys Asp Thr Leu Met Ile Ser Arg Thr Pro
                245                 250                 255

Glu Val Thr Cys Val Val Val Asp Val Ser His Glu Asp Pro Glu Val
            260                 265                 270

Lys Phe Asn Trp Tyr Val Asp Gly Val Glu Val His Asn Ala Lys Thr
        275                 280                 285

Lys Pro Arg Glu Glu Gln Tyr Asn Ser Thr Tyr Arg Val Val Ser Val
    290                 295                 300

Leu Thr Val Leu His Gln Asp Trp Leu Asn Gly Lys Glu Tyr Lys Cys
305                 310                 315                 320

Lys Val Ser Asn Lys Ala Leu Pro Ala Pro Ile Glu Lys Thr Ile Ser
                325                 330                 335

Lys Ala Lys Gly Gln Pro Arg Glu Pro Gln Val Tyr Thr Leu Pro Pro
            340                 345                 350

Ser Arg Glu Glu Met Thr Lys Asn Gln Val Ser Leu Thr Cys Leu Val
        355                 360                 365

Lys Gly Phe Tyr Pro Ser Asp Ile Ala Val Glu Trp Glu Ser Asn Gly
    370                 375                 380

Gln Pro Glu Asn Asn Tyr Lys Thr Thr Pro Pro Val Leu Asp Ser Asp
385                 390                 395                 400

Gly Ser Phe Phe Leu Tyr Ser Lys Leu Thr Val Asp Lys Ser Arg Trp
                405                 410                 415

Gln Gln Gly Asn Val Phe Ser Cys Ser Val Met His Glu Ala Leu His
            420                 425                 430

Asn His Tyr Thr Gln Lys Ser Leu Ser Leu Ser Pro Gly
        435                 440                 445

<210> SEQ ID NO 6
<211> LENGTH: 15
<212> TYPE: PRT
<213> ORGANISM: Artificial Sequence
<220> FEATURE:
<223> OTHER INFORMATION: Synthetic polypeptide

<400> SEQUENCE: 6

Lys Ser Ser Glu Ser Val Asp Ser Tyr Ala Asn Ser Phe Leu His
1               5                   10                  15

<210> SEQ ID NO 7
<211> LENGTH: 7

```
<212> TYPE: PRT
<213> ORGANISM: Artificial Sequence
<220> FEATURE:
<223> OTHER INFORMATION: Synthetic polypeptide

<400> SEQUENCE: 7

Arg Ala Ser Thr Arg Glu Ser
1               5

<210> SEQ ID NO 8
<211> LENGTH: 9
<212> TYPE: PRT
<213> ORGANISM: Artificial Sequence
<220> FEATURE:
<223> OTHER INFORMATION: Synthetic polypeptide

<400> SEQUENCE: 8

Gln Gln Ser Lys Glu Asp Pro Leu Thr
1               5

<210> SEQ ID NO 9
<211> LENGTH: 111
<212> TYPE: PRT
<213> ORGANISM: Artificial Sequence
<220> FEATURE:
<223> OTHER INFORMATION: Synthetic polypeptide

<400> SEQUENCE: 9

Asp Ile Val Met Thr Gln Ser Pro Asp Ser Leu Ala Val Ser Leu Gly
1               5                   10                  15

Glu Arg Ala Thr Ile Asn Cys Lys Ser Ser Glu Ser Val Asp Ser Tyr
            20                  25                  30

Ala Asn Ser Phe Leu His Trp Tyr Gln Gln Lys Pro Gly Gln Pro Pro
        35                  40                  45

Lys Leu Leu Ile Tyr Arg Ala Ser Thr Arg Glu Ser Gly Val Pro Asp
    50                  55                  60

Arg Phe Ser Gly Ser Gly Ser Gly Thr Asp Phe Thr Leu Thr Ile Ser
65                  70                  75                  80

Ser Leu Gln Ala Glu Asp Val Ala Val Tyr Tyr Cys Gln Gln Ser Lys
                85                  90                  95

Glu Asp Pro Leu Thr Phe Gly Gly Gly Thr Lys Val Glu Ile Lys
            100                 105                 110

<210> SEQ ID NO 10
<211> LENGTH: 218
<212> TYPE: PRT
<213> ORGANISM: Artificial Sequence
<220> FEATURE:
<223> OTHER INFORMATION: Synthetic polypeptide

<400> SEQUENCE: 10

Asp Ile Val Met Thr Gln Ser Pro Asp Ser Leu Ala Val Ser Leu Gly
1               5                   10                  15

Glu Arg Ala Thr Ile Asn Cys Lys Ser Ser Glu Ser Val Asp Ser Tyr
            20                  25                  30

Ala Asn Ser Phe Leu His Trp Tyr Gln Gln Lys Pro Gly Gln Pro Pro
        35                  40                  45

Lys Leu Leu Ile Tyr Arg Ala Ser Thr Arg Glu Ser Gly Val Pro Asp
    50                  55                  60

Arg Phe Ser Gly Ser Gly Ser Gly Thr Asp Phe Thr Leu Thr Ile Ser
65                  70                  75                  80
```

Ser Leu Gln Ala Glu Asp Val Ala Val Tyr Tyr Cys Gln Gln Ser Lys
                85                  90                  95

Glu Asp Pro Leu Thr Phe Gly Gly Thr Lys Val Glu Ile Lys Arg
            100                 105                 110

Thr Val Ala Ala Pro Ser Val Phe Ile Phe Pro Pro Ser Asp Glu Gln
            115                 120                 125

Leu Lys Ser Gly Thr Ala Ser Val Val Cys Leu Leu Asn Asn Phe Tyr
        130                 135                 140

Pro Arg Glu Ala Lys Val Gln Trp Lys Val Asp Asn Ala Leu Gln Ser
145                 150                 155                 160

Gly Asn Ser Gln Glu Ser Val Thr Glu Gln Asp Ser Lys Asp Ser Thr
                165                 170                 175

Tyr Ser Leu Ser Ser Thr Leu Thr Leu Ser Lys Ala Asp Tyr Glu Lys
            180                 185                 190

His Lys Val Tyr Ala Cys Glu Val Thr His Gln Gly Leu Ser Ser Pro
        195                 200                 205

Val Thr Lys Ser Phe Asn Arg Gly Glu Cys
    210                 215

<210> SEQ ID NO 11
<211> LENGTH: 1395
<212> TYPE: DNA
<213> ORGANISM: Artificial Sequence
<220> FEATURE:
<223> OTHER INFORMATION: Synthetic polynucleotide

<400> SEQUENCE: 11

```
atgggatggt cttggatctt tctgctgttt ctgtctggta ctgctggtgt gctgagccag      60
gtccagctgg tgcaatccgg cgcagaggtg aagaagccag cgcgttccgt gaaggtgagc     120
tgtaaggcct ctggctacat cttcacagca tacaccatgc actgggtgag gcaagctcct     180
gggcagggac tggagtggat gggatggatt aaacccaaca atgggctggc caactacgcc     240
cagaaattcc agggtagggt cactatgaca agggatacca gcatcagcac cgcatatatg     300
gagctgagca ggctgaggtc tgacgacact gctgtctatt attgcgccag gagcgaaatt     360
acaacagaat tcgattactg ggggcagggc accctggtga ccgtgtcctc tgccagcacc     420
aagggcccaa gcgtgttccc cctggccccc agcagcaaga gcaccagcgg cggcacagcc     480
gccctgggct gcctggtgaa ggactacttc cccgagcccg tgaccgtgtc ctggaacagc     540
ggagccctca cttctggagt tcataccttc ccagcagtat tgcagagcag tggcctgtat     600
tcactgtctt ccgtcgtaac agttccatcc tccagcctcg gaacacagac ttacatttgt     660
aacgtgaatc acaagcctag caacaccaag gtcgacaaga gagttgaacc aaagagttgt     720
gattgccact gtcctccctg cccagctcct gagctgcttg gcggtcccag tgtcttcttg     780 tttccccta aacccaaaga caccctgatg atctcaagga ctcccgaggt gacatgcgtg     840
gtggtggatg tgtctcatga ggacccagag gtgaagttca actggtacgt ggacggcgtg     900
gaggtgcaca acgccaagac caagcccaga gaggagcagt acaacagcac ctacagggtg     960
gtgtccgtgc tgaccgtgct gcaccaggac tggctgaacg gcaaggagta caagtgtaag    1020
gtgtccaaca aggccctgcc agccccaatc gaaaagacca tcagcaaggc caagggccag    1080
ccaagagagc cccaggtgta caccctgcca cccagcaggg aggagatgac caagaaccag    1140
gtgtccctga cctgtctggt gaagggcttc tacccaagcg acatcgccgt ggagtgggag    1200
agcaacggcc agcccgagaa caactacaag accaccccc cagtgctgga cagcgacggc    1260
```

```
agcttcttcc tgtacagcaa gctgaccgtg acaagagca gatggcagca gggcaacgtg    1320
ttcagctgct ccgtgatgca cgaggccctg cacaaccact acacccagaa gagcctgagc    1380
ctgtccccag gctga                                                    1395

<210> SEQ ID NO 12
<211> LENGTH: 30
<212> TYPE: DNA
<213> ORGANISM: Artificial Sequence
<220> FEATURE:
<223> OTHER INFORMATION: Synthetic polynucleotide

<400> SEQUENCE: 12
ggctacatct tcacagcata caccatgcac                                    30

<210> SEQ ID NO 13
<211> LENGTH: 51
<212> TYPE: DNA
<213> ORGANISM: Artificial Sequence
<220> FEATURE:
<223> OTHER INFORMATION: Synthetic polynucleotide

<400> SEQUENCE: 13
tggattaaac ccaacaatgg gctggccaac tacgcccaga aattccaggg t             51

<210> SEQ ID NO 14
<211> LENGTH: 27
<212> TYPE: DNA
<213> ORGANISM: Artificial Sequence
<220> FEATURE:
<223> OTHER INFORMATION: Synthetic polynucleotide

<400> SEQUENCE: 14
agcgaaatta caacagaatt cgattac                                       27

<210> SEQ ID NO 15
<211> LENGTH: 508
<212> TYPE: DNA
<213> ORGANISM: Artificial Sequence
<220> FEATURE:
<223> OTHER INFORMATION: Synthetic polynucleotide

<400> SEQUENCE: 15
gctgatttac agggcttcta ccagggagag cggcgtgccc gataggttca gcggatctgg    60
cagcggcacc gactttacac tgaccatctc cagcctgcag gccgaagatg tggcagtcta   120
ttactgccag cagtccaagg aggaccccct gactttcggg ggtggtacta aagtggagat   180
caagcgtacg gtggccgctc ccagcgtgtt catcttcccc ccaagcgacg agcagctgaa   240
gagcggcacc gccagcgtgg tgtgtctgct gaacaacttc tacccagggg aggccaaggt   300
gcagtggaag gtggacaacg ccctgcagag cggcaacagc caggagagcg tcaccgagca   360
ggacagcaag gactccacct acagcctgag cagcaccctg accctgagca aggccgacta   420
cgagaagcac aaggtgtacg cctgtgaggt gacccaccag ggcctgtcca gccccgtgac   480
caagagcttc aacaggggcg agtgctga                                     508

<210> SEQ ID NO 16
<211> LENGTH: 45
<212> TYPE: DNA
<213> ORGANISM: Artificial Sequence
<220> FEATURE:
<223> OTHER INFORMATION: Synthetic polynucleotide

<400> SEQUENCE: 16
```

```
aaaagctccg aatctgtgga ctcttacgca aacagctttc tgcac                  45

<210> SEQ ID NO 17
<211> LENGTH: 21
<212> TYPE: DNA
<213> ORGANISM: Artificial Sequence
<220> FEATURE:
<223> OTHER INFORMATION: Synthetic polynucleotide

<400> SEQUENCE: 17
agggcttcta ccagggagag c                                            21

<210> SEQ ID NO 18
<211> LENGTH: 27
<212> TYPE: DNA
<213> ORGANISM: Artificial Sequence
<220> FEATURE:
<223> OTHER INFORMATION: Synthetic polynucleotide

<400> SEQUENCE: 18
cagcagtcca aggaggaccc cctgact                                      27
```

METHODS OF TREATMENT OF NON-SMALL-CELL LUNG CARCINOMA USING TELISOTUZUMAB VEDOTIN

CROSS REFERENCE TO RELATED APPLICATIONS

This application claims the benefit of U.S. Provisional Application Ser. No. 63/171,536, filed Apr. 6, 2021, and U.S. Provisional Application Ser. No. 63/171,571, filed Apr. 6, 2021, each of which is hereby incorporated by reference in its entirety.

1. SEQUENCE LISTING

The instant application contains a Sequence Listing which has been submitted electronically in ASCII format and is hereby incorporated by reference in its entirety. Said ASCII copy, created on Apr. 5, 2022, is named 381493_190077_SL.txt and is 13,581 bytes in size.

2. TECHNICAL FIELD

The present application pertains to, among other things, improved methods of treatment of non-small-cell lung carcinoma using telisotuzumab vedotin (Teliso-V; ABBV-399) and methods of selecting specific patient populations for treatment.

3. BACKGROUND c-Met is a signaling tyrosine kinase receptor expressed on the surface of epithelial and endothelial cells. Activation of c-Met by hepatocyte growth factor (HGF), its only known ligand, has been shown to control cell proliferation, angiogenesis, survival, and cellular motility (Ma et al., 2003, Cancer Metastasis Rev., 22:309-325; Gherardi et al., 2012, Nat Rev Cancer., 12:89-103). Deregulation of c-Met signaling via receptor upregulation has been implicated in the development of non-small-cell lung cancer (NSCLC) (Ma et al., 2005, Cancer Res., 65:1479-1488; Spigel et al., 2013, J Clin Oncol., 31:4105-4114; The Cancer Genome Atlas Research Network, 2014, Nature, 511:543-550).

NSCLC represents 85% of all lung cancers and is the leading cause of cancer-related death worldwide (GLOBOCAN, 2018; American Cancer Society: Cancer Facts and FIGURES 2018). Aberrant c-Met signaling is common in NSCLC and is believed to occur via multiple mechanisms. Deregulated c-Met signaling has been associated with poor prognosis (Cappuzzo et al., 2009, J Clin Oncol., 27(10): 1667-1674; Vuong et al., 2018, Lung Cancer., 123:76-82; Tong et al., 2016, Clin Cancer Res., 22(12):3048-3056), tumorigenesis, resistance to chemotherapy/radiotherapy (Gu et al., 2016, J Hematol Oncol., 9:66-68) and acquired resistance to epidermal growth factor receptor (EGFR) tyrosine kinase inhibitors (TKI) (Turke et al., 2010, Cancer Cell., 17(1):77-88).

The first-in-class ADC telisotuzumab vedotin (Teliso-V), was created by linking the anti-c-Met humanized monoclonal antibody ABT-700 to monomethyl auristatin E (MMAE) via a valine-citrulline linker (ABT-700-vcMMAE). ABT-700 has been shown to specifically target Teliso-V to c-Met-expressing tumor cells with high affinity (Wang et al., 2016, BMC Cancer., 16:105-119; Wang et al., 2017, Clin Cancer Res., 23:992-1000). Teliso-V has demonstrated promising antitumor activity in preclinical studies in cells overexpressing c-Met, independent of MET amplification status, potentially expanding the target population for this drug to patients whose tumors express c-Met (Wang et al., 2017, Clin Cancer Res., 23:992-1000). This led to the design of a phase 1/1b dose escalation and expansion study in patients with solid tumors, not initially preselected by c-Met protein expression (NCT02099058). Preliminary data from this study was used to inform the design of a phase 2 multicenter, non-randomized, single-arm, 2-stage, adaptive enrichment study in patients with c-Met+ locally advanced or metastatic NSCLC (NCT03539536). The first stage of this study, i.e., Stage 1, was designed to assess the efficacy of Teliso-V monotherapy (1.9 mg/kg, once every 2 weeks) in 3 NSCLC cohorts (based on histopathology and EGFR mutation status) that are c-Met+ and 5 groups (by further evaluating non-squamous cohorts based on intermediate vs high c-Met expression levels) to identify the population(s) most likely to benefit from treatment with Teliso-V. The second stage of this study, Stage 2, is designed to further evaluate efficacy of Teliso-V in specific group(s) if they have an objective response rate (ORR) greater than 25%.

4. SUMMARY

Provided herein are methods for treating a subject having NSCLC with a known EGFR status comprising administering a therapeutically effective amount of Teliso-V to the subject if the NSCLC has a positive, intermediate, or high c-Met expression level as determined by immunohistochemistry (IHC). A therapeutically effective amount of Teliso-V is an amount sufficient to result in stable disease, partial response or a confirmed response in the subject per RECIST v1.1, and/or increase the time to disease progression.

Further provided herein are methods for treating NSCLC in a subject, the method comprising: determining that a NSCLC sample from the subject comprises a positive, intermediate or high c-Met expression level as determined by IHC, and administering an effective amount of Teliso-V to the subject, whereby the NSCLC is treated. In certain embodiments, the subject is excluded from treatment when their NSCLC sample comprises a negative c-Met expression level as determined by IHC.

Provided herein are methods of treating NSCLC comprising administering an effective amount of Teliso-V, wherein treatment is based upon c-Met overexpression in a NSCLC sample and results in an objective response rate greater than 25%.

Provided herein are diagnostic methods for determining c-Met expression in NSCLC, wherein an MC determination of positive, intermediate, or high c-Met expression is associated with increased efficacy when a subject having said NSCLC is treated with Teliso-V, and wherein detection of negative c-Met expression as determined by IHC excludes the patient from treatment with Teliso-V.

5. BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 2A:
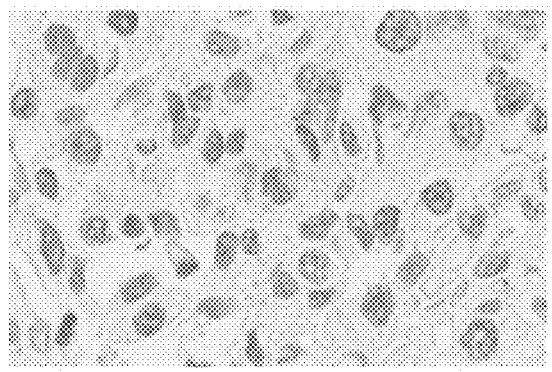
FIGS. 2A-2D show representative membranous staining intensities for c-Met on non-squamous NSCLC. SP44
Figure 2B:
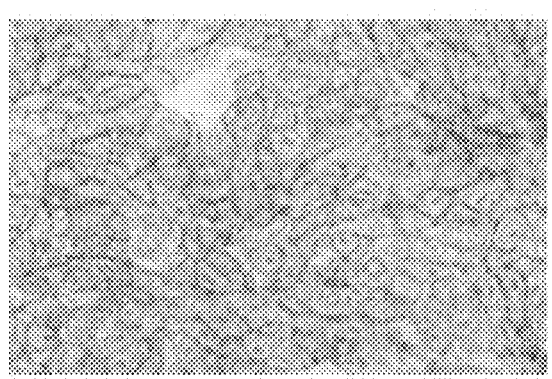
Figure 2C:
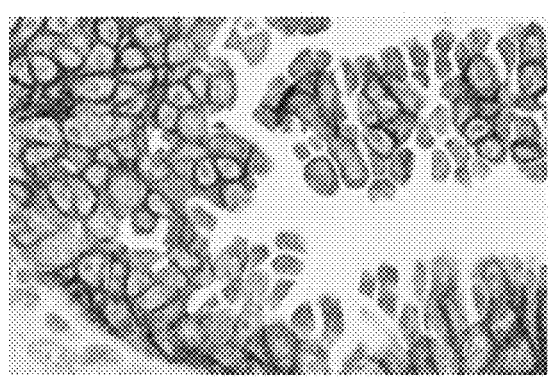
Figure 2D:
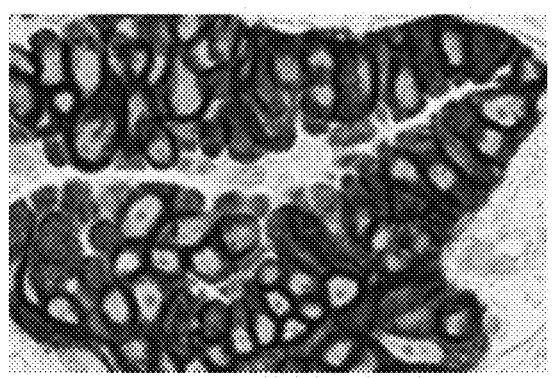

OptiView IHC Membranous Staining Intensities 20× of IHC score of 0 (FIG. 2A); 1+ (FIG. 2B); 2+ (FIG. 2C); and 3+ (FIG. 2D).

Figures 1, 3A:
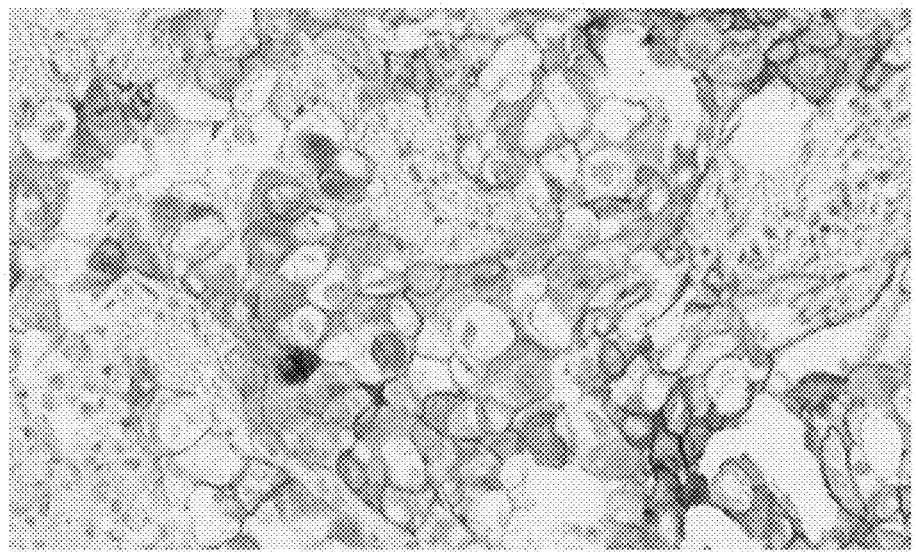
Figures 2, 3A:
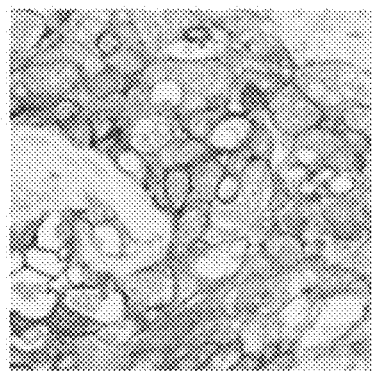
Figures 3, 3A:
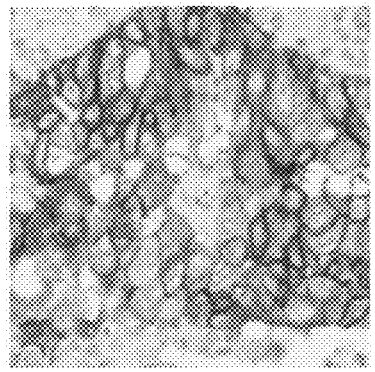
Figures 1, 3B:
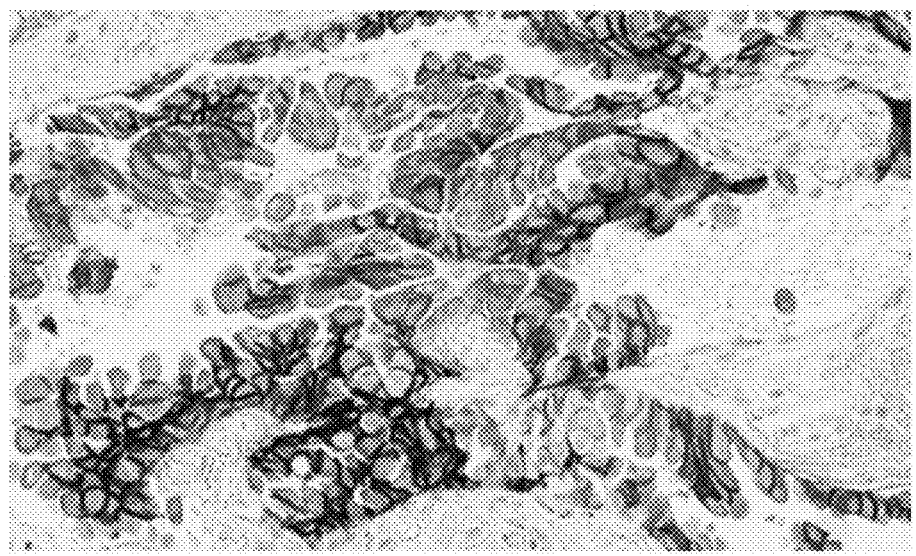
Figures 2, 3B:
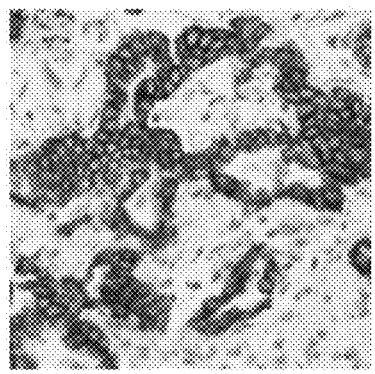
Figures 3, 3B:
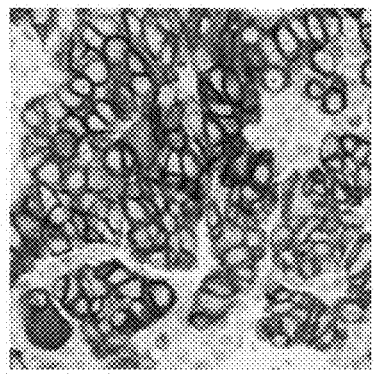
Figures 1, 3C:
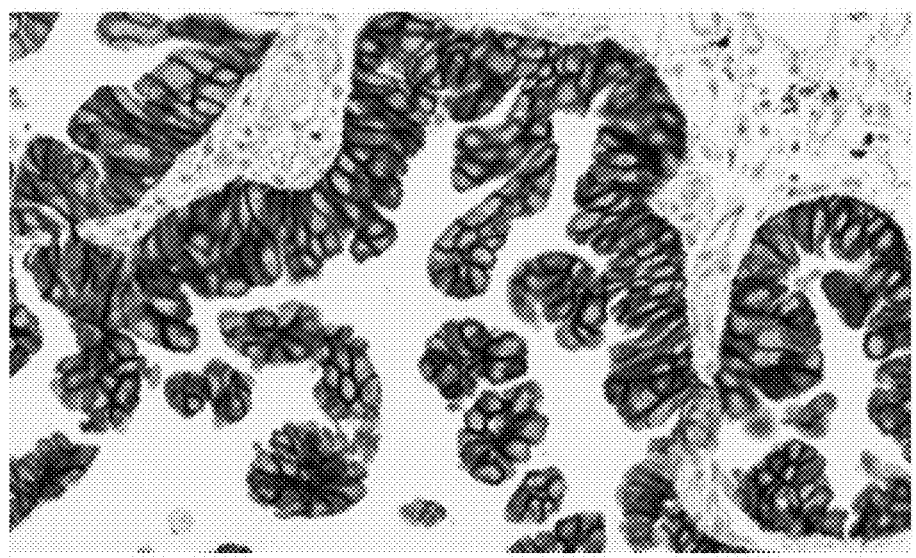
Figures 2, 3C:
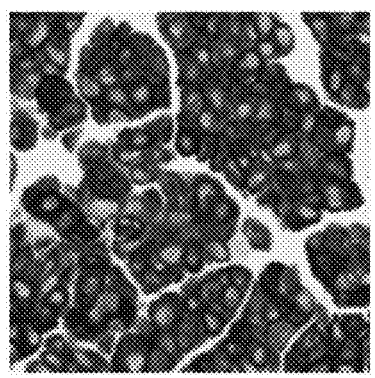
Figures 3, 3C:
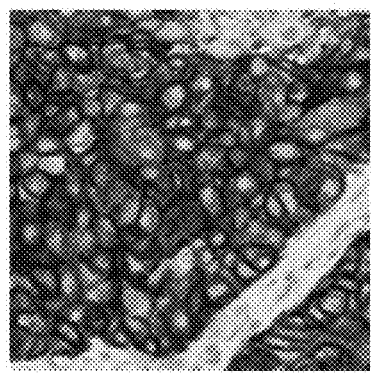

FIGS. 3A1-3C3, FIGS. 3B1-3B3, and FIGS. 3C1-3C3 show representative membranous staining intensities for c-Met on non-squamous NSCLC. SP44 OptiView IHC Membranous Staining Intensities 20× of c-Met Negative (FIGS. 3A1-3A3); c-Met Positive (FIGS. 3B1-3B3); and c-Met High (FIGS. 3C1-3C3).

Figure 4:
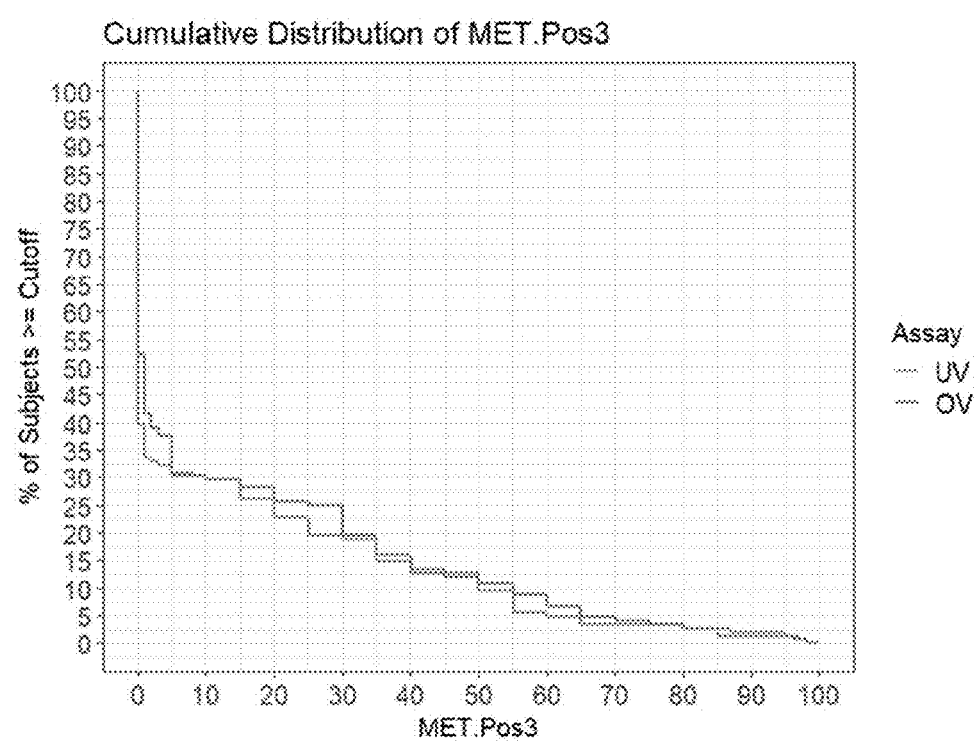

FIG. 4 shows distribution of SP44 UltraView and OptiView IHC at 3+ intensity staining on a commercial cohort of NSCLC.

Figure 5:
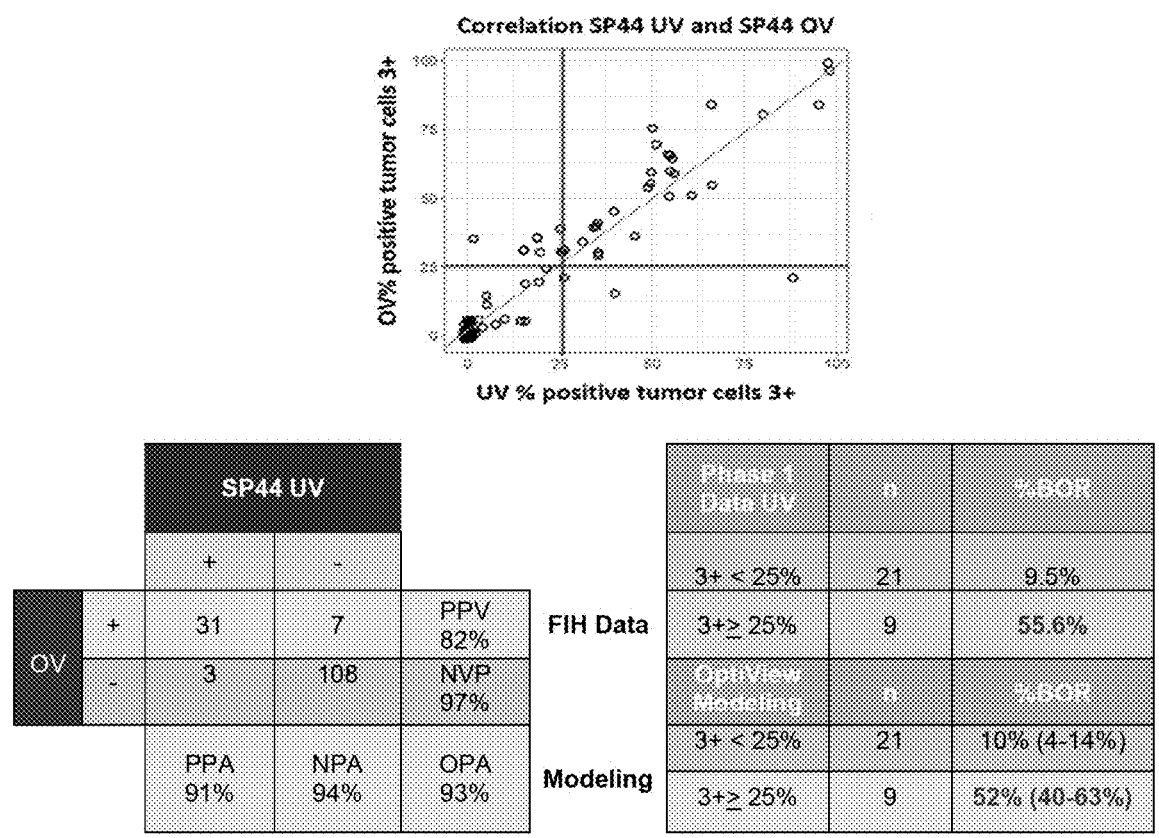

FIG. 5 shows that ≥25% 3+ cutoff for SP44 OptiView, selects similar patient population as SP44 Ultraview. Abbreviations shown in FIG. 5 and determination of the values in the table are as follow: PPA (positive percent agreement): #oV positive uV positive/Total uV positive; NPA (Negative percent agreement): #oV negative uV negative/Total uV negative; OPA (Overall percent agreement): #oV positive uV positive+#oV negative uV negative/Total number of samples tested; PPV (Positive predictive value): # of oV positive uV positive/total # of oV positive; NPV (Negative predictive value): # of oV negative uV negative/Total oV negative. % BOR represents the percent best overall response.

Figure 6:
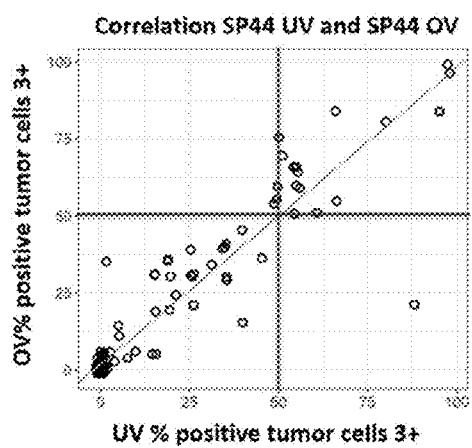

FIG. 6 shows that ≥50% 3+ cutoff for SP44 OptiView, selects similar patient population as SP44 Ultraview. Abbreviations shown in FIG. 6 and determination of the values in the table are as follow: PPA (positive percent agreement): #oV positive uV positive/Total uV positive; NPA (Negative percent agreement): #oV negative uV negative/Total uV negative; OPA (Overall percent agreement): #oV positive uV positive+#oV negative uV negative/Total number of samples tested; PPV (Positive predictive value): # of oV positive uV positive/total # of oV positive; NPV (Negative predictive value): # of oV negative uV negative/Total oV negative. % BOR represents the percent best overall response.

Figure 7:
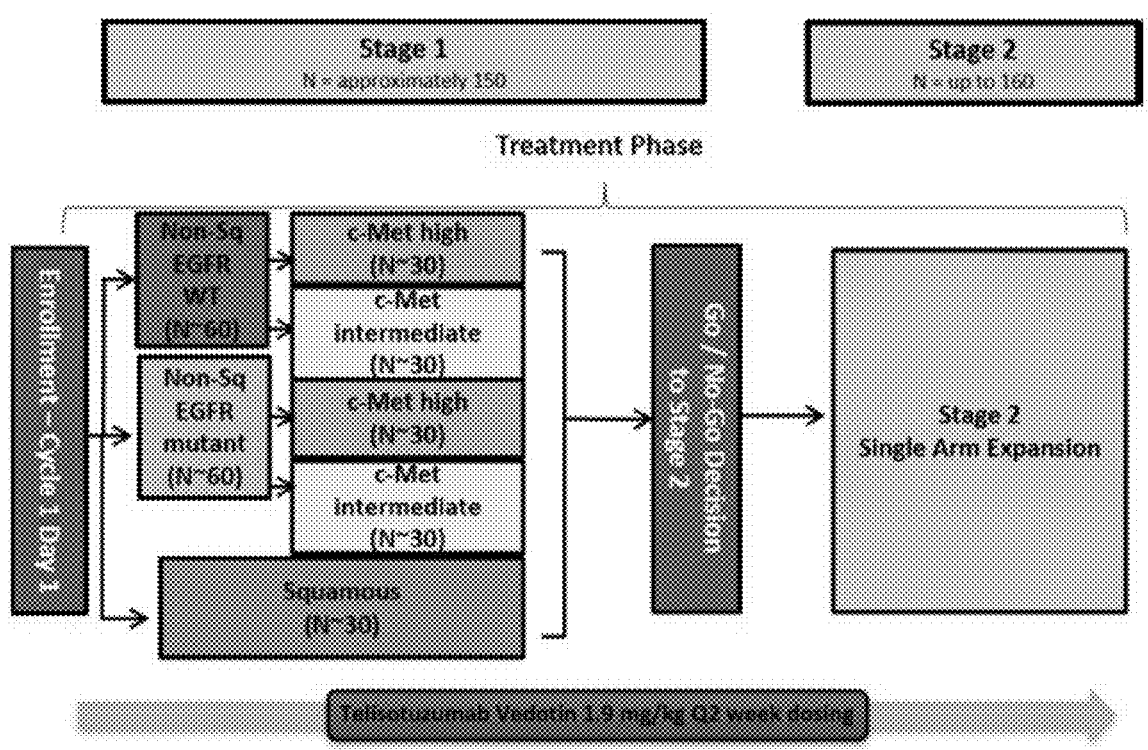

FIG. 7 shows the design of a phase 2 multicenter, non-randomized, single-arm, 2-stage, adaptive enrichment study in patients with c-Met+ locally advanced or metastatic NSCLC (NCT03539536).

FIGS. 8A-8B summarize the Overall Response Rate (ORR) and the probability of obtaining an ORR of 25% in patients from the phase 2 multicenter, non-randomized, single-arm, 2-stage, adaptive enrichment study in patients with c-Met+ locally advanced or metastatic NSCLC (NCT03539536). FIG. 8A presents results grouped according to tumor histology, c-Met expression level and EGFR status (WT=wild type, MU=mutated). FIG. 8B presents results grouped according to tumor histology and EGFR status.

6. DETAILED DESCRIPTION

6.1. Anti-c-Met ADC: Telisotuzumab Vedotin

As described throughout the specification, telisotuzumab vedotin (Teliso-V) is an ADC comprised of the c-Met targeting antibody ABT-700 (PR-1266688, h224G11) conjugated to the potent cytotoxin monomethyl auristatin E (MMAE) through a valine citrulline (vc) linker. Conjugation to ABT-700 is via a thioether linkage formed with a sulfhydryl group of a cysteine residue of ABT-700. The production and biological activities of ABT-700 are described in U.S. Pat. No. 8,741,290. The production and biological activities of telisotuzumab vedotin are described in U.S. Pat. No. 10,603,389.

Telisotuzumab vedotin, as used herein, refers to an ADC having the following structural formula:

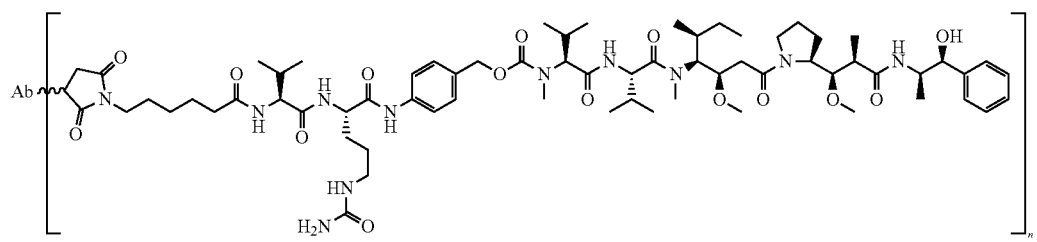

wherein n is 2 or 4, the Ab is ABT-700, and conjugation of the drug to the antibody is via a linkage formed with a sulfhydryl group of a cysteine residue of ABT-700. In a preferred embodiment, n has a value of 2. In a preferred embodiment, n has a value of 4. The purification and characterization of telisotuzumab vedotin with n equal to 2 or 4 is described in U.S. Pat. No. 10,603,389.

Telisotuzumab vedotin has been used in a Phase 1 clinical trial (see Example 16 of U.S. Pat. No. 10,603,389) in a pharmaceutical formulation with a DAR of about 2.4 to 3.6, for example, 3.1.

Telisotuzumab vedotin can be used at a 1:1 E2/E4 ratio, which corresponds to an average DAR of 3.0 or about 3.0. In other words, telisotuzumab vedotin is used as a composition comprising a 1:1 ratio of the E2 and E4 purified fractions of antibody-drug conjugate. In other alternative embodiments, telisotuzumab vedotin can be used at a DAR of 2.9.

ABT-700, as used herein, refers to any antibody having the following heavy and light chain sequences. The heavy chain of ABT-700 comprises (constant regions are bold; CDRs are underlined (Kabat-numbered CDR sequences disclosed as SEQ ID NOS:1-3, respectively, in order of appearance)):

```
QVQLVQSGAE VKKPGASVKV SCKASGYIFT AYTMHWVRQA PGQGLEWMGW   050

IKPNNGLANY AQKFQGRVTM TRDTSISTAY MELSRLRSDD TAVYYCARSE   100

ITTEFDYWGQ GTLVTVSSAS TKGPSVFPLA PSSKSTSGGT AALGCLVKDY   150

FPEPVTVSWN SGALTSGVHT FPAVLQSSGL YSLSSVVTVP SSSLGTQTYI   200

CNVNHKPSNT KVDKRVEPKS CDCHCPPCPA PELLGGPSVF LFPPKPKDTL   250

MISRTPEVTC VVVDVSHEDP EVKFNWYVDG VEVHNAKTKP REEQYNSTYR   300

VVSVLTVLHQ DWLNGKEYKC KVSNKALPAP IEKTISKAKG QPREPQVYTL   350

PPSREEMTKN QVSLTCLVKG FYPSDIAVEW ESNGQPENNY KTTPPVLDSD   400

GSFFLYSKLT VDKSRWQQGN VFSCSVMHEA LHNHYTQKSL SLSPG        445
```

(variable region sequence disclosed as SEQ ID NO:4)
(full-length sequence disclosed as SEQ ID NO:5)
and the light chain of ABT-700 comprises (CDR sequences disclosed as SEQ ID NOS:6-8, respectively, in order of appearance):

```
DIVMTQSPDS LAVSLGERAT INCKSSESVD SYANSFLHWY QQKPGQPPKL   050

LIYRASTRES GVPDRFSGSG SGTDFTLTIS SLQAEDVAVY YCQQSKEDPL   100

TFGGGTKVEI KRTVAAPSVF IFPPSDEQLK SGTASVVCLL NNFYPREAKV   150

QWKVDNALQS GNSQESVTEQ DSKDSTYSLS STLTLSKADY EKHKVYACEV   200

THQGLSSPVT KSFNRGEC                                      218
```

(variable region sequence disclosed as SEQ ID NO:9) (full-length sequence disclosed as SEQ ID NO:10)

In one embodiment, the ABT-700 heavy chain is encoded by the following nucleotide sequence (full-length sequence disclosed as SEQ ID NO:11):

ATGGGATGGTCTTGGATCTTTCTGCTGTTTCTGTCTGGTACTGCTGGTGT

GCTGAGCcaggtccagctggtgcaatccggcgcagaggtgaagaagccag gcgcttccgtgaaggtgagctgtaaggcctctggctacatcttcacagca tacaccatgcactgggtgaggcaagctcctgggcagggactggagtggat gggatggattaaacccaacaatgggctggccaactacgcccagaaattcc agggtagggtcactatgacaagggataccagcatcagcaccgcatatatg gagctgagcaggctgaggtctgacgacactgctgtctattattgcgccag gagcgaaattacaacagaattcgattactgggggcagggcaccctggtga ccgtgtcctctgccagcaccaagggcccaagcgtgttccccctggcccc agcagcaagagccaccagcggcggcacagccgccctgggctgcctggtgaa ggactacttccccgagcccgtgaccgtgtcctggaacagcggagccctca cttctggagttcataccttcccagcagtattgcagagcagtggcctgtat tcactgtcttccgtcgtaacagttccatcctccagcctcgggacacagac ttacatttgtaacgtgaatcacaagcctagcaacaccaaggtcgacaaga gagttgaaccaaagagttgtgattgccactgtcctccctgcccagctcct gagctgcttggcggtcccagtgtcttcttgtttcccctaaacccaaaga caccctgatgatctcaaggactcccgaggtgacatgcgtggtggtggatg tgtctcatgaggacccagaggtgaagttcaactggtacgtggacggcgtg gaggtgcacaacgccaagaccaagcccagagaggagcagtacaacagcac ctacagggtggtgtccgtgctgaccgtgctgcaccaggactggctgaacg gcaaggagtacaagtgtaaggtgtccaacaaggccctgccagccccaatc gaaaagaccatcagcaaggccaagggccagccaagagagccccaggtgta caccctgccacccagcagggaggagatgaccaagaaccaggtgtccctga cctgtctggtgaagggcttctacccaagcgacatcgccgtggagtgggag agcaacggccagcccgagaacaactacaagaccacccccccagtgctgga cagcgacggcagcttcttcctgtacagcaagctgaccgtggacaagagca gatggcagcagggcaacgtgttcagctgctccgtgatgcacgaggccctg cacaaccactacacccagaagagcctgagcctgtccccaggctga Secretion signal peptide in bold CAPITAL letters; includes final stop codon (TGA); constant region is bold; CDRs are underlined (CDR sequences disclosed as SEQ ID NOS:12-14, respectively, in order of appearance)

In one embodiment, the ABT-700 light chain is encoded by the following nucleotide sequence (full-length sequence disclosed as SEQ ID NO:15):

ATGGAAACTGATACACTGCTGCTGTGGGTCCTGCTGCTGTGGGTCCCTGG

AAGCACAGGGgacattgtgatgacccagtctcccgatagcctggccgtgt ccctgggcgagagggctaccatcaactgtaaaagctccgaatctgtggac tcttacgcaaacagctttctgcactggtatcagcaaaagccaggccaacc tccaaagctgctgatttacagggcttctaccagggagagcggcgtgcccg ataggttcagcggatctggcagcggcaccgactttacactgaccatctcc agcctgcaggccgaagatgtggcagtctattactgccagcagtccaagga ggaccccctgactttcggggggtggtactaaagtggagatcaagcgtacgg tggccgctcccagcgtgttcatcttccccccaagcgacgagcagctgaag agcggcaccgccagcgtggtgtgtctgctgaacaacttctacccaggga ggccaaggtgcagtggaaggtggacaacgccctgcagagcggcaacagcc aggagagcgtcaccgagcaggacagcaaggactccacctacagcctgagc agcaccctgaccctgagcaaggccgactacgagaagcacaaggtgtacgc ctgtgaggtgacccaccagggcctgtccagccccgtgaccaagagcttca acaggggcgagtgctga Secretion signal peptide in bold CAPITAL letters; includes final stop codon (tga); constant region is bold; CDRs are underlined (CDR sequences disclosed as SEQ ID NOS:16-18, respectively, in order of appearance).

6.2. Compositions

Teliso-V is provided as an aqueous composition suitable for administration via intravenous infusion. In some embodiments, the aqueous composition comprises 20 mg/mL Teliso-V, 10 mM histidine buffer, pH 6.0, 7% (w/v) sucrose, 0.03% (w/v) polysorbate 80. The composition may be in the form of a lyophilized powder that, upon reconstitution with 5.2 mL sterile water or other solution suitable for injection or infusion (for example, 0.9% saline, Ringer's solution, lactated Ringer's solution, etc.) provides the above aqueous composition.

6.3. Methods of Use

The methods described herein involve treating patients with Teliso-V who have non-squamous NSCLC in which c-Met is overexpressed and the EGFR status is known. The NSCLC cancer may be relapsed, refractory, or relapsed and refractory, or a metastasis or metastatic form of a c-Met-overexpressing tumor. Teliso-V is typically administered once every two weeks (14 days) at 1.9 mg/kg. In an embodiment, Teliso-V is administered once every two weeks (14 days) at 1.6 mg/kg. To demonstrate efficacy, subjects treated with Teliso-V should have an objective response rate (ORR) greater than 25% and median duration of response (DoR) of 6 months or more (i.e., of at least 6 months, at least 8 months, and/or at least 10 months). Other efficacy endpoints include progression free survival (PFS), overall survival (OS), and an acceptable safety and tolerability profile.

Results from the Stage 1 Interim 3 analysis of the ongoing Phase 2 study, NCT03539536, in c-Met positive advanced NSCLC subjects previously treated with platinum-based chemotherapy and immune checkpoint inhibitor (or prior standard TKI therapy, 2 and 3rd line) demonstrated clinical proof of concept for Teliso-V in non-squamous NSCLC EGFR wildtype subjects (see FIGS. 8A and 8B). The ORR was 35.1% (posterior probability of exceeding 25% ORR=91.9%) in EGFR wildtype subjects with c-Met positive NSCLC (FIG. 8B). Within the c-Met positive EGFR cohort, the ORR was highest in the non-squamous c-Met high EGFR WT cohort, i.e., 53.8% vs 25% for the c-Met intermediate EGFR WT cohort (FIG. 8A). The Stage 1

Interim 3 results support initiation of the Stage 2 study in c-Met positive EGFR wildtype non-squamous NSCLC subjects. Although the ORR in non-squamous NSCLC EGFR mutant cohorts was 13.3% (FIG. 8B), the Stage 1 study will continue until the number of evaluable subjects for efficacy is reached. The results from Interim Analysis 3 do not support the use of Teliso-V to treat subjects with squamous NSCLC (FIGS. 8A and 8B).

In a preferred embodiment, treatment of non-squamous NSCLC subjects with EGFR wildtype status achieves an ORR greater than 25%, greater than 30%, greater than 35%, greater than 40%, greater than 45%, greater than 50%, or greater than 55%. In other embodiments, treatment with Teliso-V results in progression free survival (PFS) of at least 5 months or more, or an overall survival (OS) of 13 months or more.

Treatment with Teliso-V of non-squamous NSCLC subjects with EGFR wildtype status will demonstrate a favorable safety profile with less than 20%, optionally less than 15% or less than 10%, of the adverse events, i.e., peripheral neuropathy, neutropenia, pneumonitis and ocular toxicity, leading to discontinuation of treatment with Teliso-V. Subjects that experience an adverse event of 3+ or greater, will be less than 20&, optionally less than 15%, or less than 10%.

In a preferred embodiment, treatment of non-squamous NSCLC subjects with EGFR mutant status achieves an ORR greater than 25%, greater than 30%, greater than 35%, greater than 40%, greater than 45%, greater than 50%, or greater than 55%. In other embodiments, treatment with Teliso-V results in progression free survival (PFS) of at least 5 months or more, or an overall survival (OS) of 13 months or more.

Treatment with Teliso-V of non-squamous NSCLC subjects with EGFR mutant status will demonstrate a favorable safety profile with less than 20%, optionally less than 15% or less than 10% of the adverse events, i.e., peripheral neuropathy, neutropenia, pneumonitis and ocular toxicity, leading to discontinuation of treatment with Teliso-V. Subjects that experience an adverse event of 3+ or greater, will be less than 20%, optionally less than 15% or less than 10%.

IHC assays are known to one of ordinary skill in the art for assessing the expression level of a target protein (see Diagnostic Immunohistochemistry: Theranostic and Genomic Applications by David Dabbs (5th edition, 2019), and Companion and Complementary Diagnostics: From Biomarker Discovery to Clinical Implementation (2019), editor JT Jorgensen). c-Met IHC assays as used in the methods of this disclosure assess overexpression levels of c-Met in tumor tissue from a subject having non-squamous NSCLC. A preferred method for determining c-Met overexpression levels is the c-Met IHC assay described in detail in Example 1 and is referred to herein as the "c-Met Teliso-V staining protocol."

In one embodiment, the method of treatment comprises the steps of determining the level of c-Met overexpression within the non-squamous NSCLC tumor by performing c-Met immunohistochemistry (IHC) on tumor tissue (i.e., obtained from a biopsy, resection or cytology sample; the tumor tissue can be archival tumor tissue or fresh tumor tissue) from the subject, and further comprising the step of determining whether the tumor tissue exhibits a) c-Met negative expression, b) c-Met positive expression, c) c-Met intermediate expression, and/or d) c-Met high expression. c-Met negative expression is defined by <25% of neoplastic cells from tumor tissue assessed by c-Met IHC have 3+ membrane or membrane+cytoplasm staining, c-Met positive expression is defined by ≥25% of neoplastic cells from tumor tissue assessed by c-Met IHC have 3+ membrane or membrane+cytoplasm staining, c-Met intermediate expression is defined by ≥25% to <50% of neoplastic cells from tumor tissue assessed by c-Met IHC have 3+ membrane or membrane+cytoplasm staining, and c-Met high expression is defined by ≥50% of neoplastic cells from tumor tissue assessed by c-Met IHC have 3+ membrane or membrane+cytoplasm staining. The level of c-Met overexpression of the NSCLC tumor is taken to be that of its sampled tissue, as determined by c-Met IHC. In some embodiments, the c-Met IHC is performed according to the c-Met Teliso-V Staining Protocol.

Based on the level of c-Met overexpression in the tumor as determined by a c-Met IHC assay, the decision to treat the subject with Teliso-V is made. In one embodiment, subjects having tumors that are EGFR wildtype and c-Met positive expression are treated with Teliso-V at a dose of 1.9 mg/kg intravenously once every two weeks. In another embodiment, subjects having tumors that are EGFR wildtype and c-Met intermediate expression are treated with Teliso-V at a dose of 1.9 mg/kg intravenously once every two weeks. In another embodiment, subjects having tumors that are EGFR wildtype and c-Met high expression are treated with Teliso-V at a dose of 1.9 mg/kg intravenously once every two weeks. In another embodiment, subjects having tumors that are EGFR wildtype and c-Met negative expression are excluded from treatment with Teliso-V at a dose of 1.9 mg/kg intravenously once every two weeks. In one embodiment, subjects having tumors that are EGFR wildtype and c-Met positive expression are treated with Teliso-V at a dose of 1.6 mg/kg intravenously once every two weeks. In another embodiment, subjects having tumors that are EGFR wildtype and c-Met intermediate expression are treated with Teliso-V at a dose of 1.6 mg/kg intravenously once every two weeks. In another embodiment, subjects having tumors that are EGFR wildtype and c-Met high expression are treated with Teliso-V at a dose of 1.6 mg/kg intravenously once every two weeks. In another embodiment, subjects having tumors that are EGFR wildtype and c-Met negative expression are excluded from treatment with Teliso-V at a dose of 1.6 mg/kg intravenously once every two weeks.

In other embodiments, subjects having tumors that are EGFR mutant and c-Met positive expression are treated with Teliso-V at a dose of 1.9 mg/kg intravenously once every two weeks. In another embodiment, subjects having tumors that are EGFR mutant and c-Met intermediate expression are treated with Teliso-V at a dose of 1.9 mg/kg intravenously once every two weeks. In another embodiment, subjects having tumors that are EGFR mutant and c-Met high expression are treated with Teliso-V at a dose of 1.9 mg/kg intravenously once every two weeks. In another embodiment, subjects having tumors that are EGFR mutant and c-Met negative expression are excluded from treatment with Teliso-V at a dose of 1.9 mg/kg intravenously once every two weeks. In other embodiments, subjects having tumors that are EGFR mutant and c-Met positive expression are treated with Teliso-V at a dose of 1.6 mg/kg intravenously once every two weeks. In another embodiment, subjects having tumors that are EGFR mutant and c-Met intermediate expression are treated with Teliso-V at a dose of 1.6 mg/kg intravenously once every two weeks. In another embodiment, subjects having tumors that are EGFR mutant and c-Met high expression are treated with Teliso-V at a dose of 1.6 mg/kg intravenously once every two weeks. In another embodiment, subjects having tumors that are EGFR mutant and c-Met negative expression are excluded from treatment with Teliso-V at a dose of 1.6 mg/kg intravenously once every two weeks.

In one embodiment, a population of subjects having non-squamous NSCLC tumors with known EGFR status are treated according to c-Met overexpression levels of their tumor tissue as determined by c-Met IHC. Each subject having a tumor that is either EGFR wildtype or mutant with c-Met positive expression is treated with Teliso-V at a dose of 1.9 mg/kg intravenously once every two weeks, while each subject having a tumor with c-Met negative expression is excluded from treatment. In an embodiment, each subject having a tumor that is either EGFR wildtype or mutant with c-Met positive expression is treated with Teliso-V at a dose of 1.6 mg/kg intravenously once every two weeks, while each subject having a tumor with c-Met negative expression is excluded from treatment. In another embodiment, each subject of the population having a tumor that is either EGFR wildtype or mutant with c-Met intermediate expression is treated with Teliso-V at a dose of 1.9 mg/kg intravenously once every two weeks, while each subject having a tumor with c-Met negative expression is excluded from treatment. In another embodiment, each subject of the population having a tumor that is either EGFR wildtype or mutant with c-Met intermediate expression is treated with Teliso-V at a dose of 1.6 mg/kg intravenously once every two weeks, while each subject having a tumor with c-Met negative expression is excluded from treatment. In another embodiment, each subject of the population having a tumor that is either EGFR wildtype or mutant with c-Met high expression is treated with Teliso-V at a dose of 1.9 mg/kg intravenously once every two weeks, while each subject having a tumor with c-Met negative expression is excluded from treatment. In another embodiment, each subject of the population having a tumor that is either EGFR wildtype or mutant with c-Met high expression is treated with Teliso-V at a dose of 1.6 mg/kg intravenously once every two weeks, while each subject having a tumor with c-Met negative expression is excluded from treatment. In another embodiment, each subject of the population having a tumor that is either EGFR wildtype or mutant with c-Met high expression is treated with Teliso-V at a dose of 1.9 mg/kg intravenously once every two weeks, while each subject having a tumor with c-Met intermediate or c-Met negative expression is excluded from treatment. In another embodiment, each subject of the population having a tumor that is either EGFR wildtype or mutant with c-Met high expression is treated with Teliso-V at a dose of 1.6 mg/kg intravenously once every two weeks, while each subject having a tumor with c-Met intermediate or c-Met negative expression is excluded from treatment.

Subjects treated with Teliso-V should achieve one or more of the following clinical endpoints: overall response rate (ORR) greater than 25%; a median duration of response (DoR) of at least 6 months; progression free survival (PFS) of at least 5 months; or overall survival (OS) of at least 13 months, and exhibit stable disease (SD); partial response (PR); or confirmed response (CR) per RECIST version 1.1.

In an embodiment, Teliso-V is administered at a dosage from 1.2 mg/kg to 2.4 mg/kg. In embodiments, Teliso-V is administered at 1.2 mg/kg, 1.4 mg/kg, 1.6 mg/kg, 1.8 mg/kg, 2.0 mg/kg, 2.2 mg/kg, or 2.4 mg/kg. As will be appreciated by those of skill in the art, the recommended dosage for Teliso-V may need to be adjusted to optimize patient response and maximize therapeutic benefit. For example, the dosage of Teliso-V may be reduced to 1.6 mg/kg to manage peripheral neuropathy. In one embodiment, the dosage for subjects weighing over 100 kg is calculated as if they weighed 100 kg. In this embodiment, the maximum dosage is 190 mg.

6.4. Patient Selection

Patients treated with Teliso-V have c-Met-overexpressing NSCLC tumors of the non-squamous type. Patients are selected for treatment with Teliso-V based on their known EGFR status, prior treatment status, and c-Met overexpression level as determined by immunohistochemistry (c-Met IHC).

In an embodiment, the following inclusion and exclusion criteria of TABLES 1 and 2 are used to determine whether a subject is eligible for treatment:

TABLE 1

| Key Inclusion Criteria |
|---|
| Age ≥ 18 years |
| c-Met+ NSCLC assessed by a designated immunohistochemistry (IHC) laboratory |
| Histologically documented non-squamous NSCLC with known EGFR status (wild type or mutant) or squamous NSCLC |
| Locally advanced or metastatic NSCLC with measurable disease per Response Evaluation Criteria In Solid Tumors (RECIST) v1.1 |
| Received ≤ 2 prior lines of systemic therapy in the locally advanced or metastatic setting, including cytotoxic chemotherapy (1 line), immunotherapy, and therapy targeting driver gene alterations (if eligible) |
| Eastern Cooperative Oncology Group (ECOG) performance status 0-1 and adequate bone marrow, renal, and hepatic function |

TABLE 2

| Key Exclusion Criteria |
|---|
| Adenosquamous histology |
| Prior c-Met-targeted antibody therapies or history of a major immunologic reaction to any IgG-containing agent |
| Unresolved clinically significant adverse events (AEs) grade ≥ 2 resulting from prior anticancer therapy, except anemia or alopecia |
| Major surgery within 21 days prior to the first dose of Teliso-V |
| Anticancer therapy within 28 days or herbal therapy/strong cytochrome P450 3A4 inhibitors within 7 days prior to the first dose of Teliso-V |

TABLE 2-continued

Key Exclusion Criteria

History of interstitial lung disease or pneumonitis requiring systemic steroid treatment
Uncontrolled central nervous system metastases unless patient has received definitive therapy, is asymptomatic, and is off systemic steroids and anticonvulsants at least 2 weeks prior to the first dose of Teliso-V 6.4.1. Selection Criteria: NSCLC Tumor Type Patients selected for treatment are patients with c-Met-overexpressing non-squamous NSCLC. Patients are selected for treatment based on their known EGFR status, prior treatment status, and c-Met expression level as determined by immunohistochemistry (IHC).

In some embodiments, patients selected for treatment with Teliso-V have a c-Met-overexpressing non-squamous NSCLC tumor type that is relapsed and/or refractory, or a metastatic form of a relapsed, refractory, or relapsed and refractory NSCLC. In some embodiments, the c-Met-overexpressing NSCLC tumor is a locally advanced and/or metastatic NSCLC.

In some embodiments, patients excluded from treatment with Teliso-V have squamous NSCLC.

The decision on whether to select a particular patient for treatment with Teliso-V requires determining whether the patient's NSCLC has cells carrying a mutation of the Epidermal Growth Factor Receptor gene (EGFR).

In some embodiments, patients selected for treatment have a c-Met-overexpressing NSCLC that does not carry a mutation in the EGFR gene, e.g., EGFR wildtype (WT). In some embodiments, patients excluded from treatment have a c-Met-overexpressing NSCLC that carries a mutation in the EGFR gene. Kinase domain mutations in EGFR are referred to as 'activating mutations' because they lead to a ligand-independent activation of TK activity. In some tumors, partially activated mutant EGFRs can be rendered fully ligand independent and, therefore, constitutively active by a second mutation (Oncogene, 2009 August; 28, Suppl 1: S24-S31). In an embodiment, subjects must have a known EGFR activating mutation status. In an embodiment, subjects with actionable EGFR activating mutations are excluded from treatment with Teliso-V. In an embodiment, subjects with actionable alterations in genes other than EGFR are eligible for treatment with Teliso-V.

In other embodiments, patients selected for treatment have a c-Met-overexpressing NSCLC that carries at least one EGFR mutation. In some embodiments, the at least one EGFR mutation is selected from an exon 19 deletion, an exon 21 L858R mutation, and/or a T790M mutation. In some embodiments, the at least one EGFR mutation is detected by an FDA-approved test.

One such test uses real-time polymerase chain reaction (PCR) to identify at least 42 mutations in exons 18, 19, 20 and 21 of the EGFR gene (including the T790M resistance mutation). The test has been clinically validated in multiple clinical trials as a companion diagnostic (CDx) for both first and second line EGFR TKI therapy in patients with advanced NSCLC (Heeke, et al., (2019) Clinical Lung Cancer, 21 (1): 56-65).

In certain embodiments, subjects are divided into groups based on both c-Met expression level as determined by IHC (i.e., negative, positive, intermediate, and high c-Met expression) and EGRF status (wild type or mutated). Decisions to treat are made with respect to each of the resulting groups.

6.4.2. Selection Criteria: Prior Treatment

In some embodiments, subjects selected for treatment have received no more than 2 lines of prior systemic therapy (including no more than 1 line of systemic cytotoxic chemotherapy) in the locally advanced or metastatic setting.

In other embodiments, subjects selected for treatment have progressed on systemic cytotoxic chemotherapy (or are ineligible for systemic cytotoxic chemotherapy) and an immune checkpoint inhibitor as monotherapy or in combination with systemic cytotoxic chemotherapy, or are ineligible for treatment with an immune checkpoint inhibitor, and if applicable, have progressed on prior anti-cancer therapies targeting tyrosine kinase inhibitors (TKIs).

In other embodiments, patients selected for treatment been previously treated with: 1) at least one cytotoxic chemotherapeutic, and 2) at least one immune checkpoint inhibitor or at least one tyrosine kinase inhibitor (TKI). In other embodiments, subjects are not selected for treatment if the subject has not been previously treated with 1) at least one cytotoxic chemotherapeutic, and 2) at least one immune checkpoint inhibitor or at least one tyrosine kinase inhibitors (TKI).

In some embodiments, the cytotoxic chemotherapeutic is a platinum chemotherapeutic such as cisplatin, oxaliplatin, and carboplatin, or a platinum based doublet, such as cisplatin/pemetrexed, carboplatin/pemetrexed, carboplatin/paclitaxel.

In some embodiments, the at least one immune checkpoint inhibitor is selected from antibodies that target PD-1 (e.g., pembrolizumab, nivolumab and pidilizumab), PD-L1 (e.g., durvalumab, atezolizumab, avelumab, MEDI4736, MSB0010718C and MPDL3280A), and CTLA4 (cytotoxic lymphocyte antigen 4; e.g., ipilimumab, tremelimumab).

In some embodiments, the at least one tyrosine kinase inhibitor (TKI) is selected from osimertinib, imatinib, dasatinib, nilotinib, bosutinib, ponatinib, afatinib, axitinib, crizotinib, erlotinib, gefitinib, lapatinib, nilotinib, pazopanib, regorafenib, sorafenib, sunitinib, toceranib, vatalanib, or radotinib.

In some embodiments, subjects selected for treatment have not received prior systemic therapy in the locally advanced or metastatic setting.

6.4.3. Selection Criteria: c-Met Expression by IHC

IHC is used to evaluate candidate patients for selection for treatment with Teliso-V on the basis of observed c-Met overexpression levels in non-squamous NSCLC tumor tissue. In some embodiments, c-Met IHC is performed on at least one non-squamous NSCLC tumor tissue from the subject, wherein the at least one tumor tissue is selected from archival tumor tissue and/or fresh tumor tissue.

In one embodiment, the level of c-Met overexpression within the non-squamous NSCLC tumor is determined by performing c-Met immunohistochemistry (c-Met IHC) on neoplastic cells from tumor tissue from the subject, and determining whether the neoplastic cells exhibit i) c-Met negative expression, ii) c-Met positive expression, iii) c-Met intermediate expression, or iv) c-Met high expression based on the results of the c-Met IHC assay. In one embodiment, the c-Met IHC is performed according to the c-Met Teliso-V Staining Protocol, described herein.

c-Met negative expression is defined by <25% of the neoplastic cells from tumor tissue assessed by c-Met IHC have 3+ membrane or membrane+cytoplasmic staining.

c-Met positive expression is defined by ≥25% of the neoplastic cells from tumor tissue assessed by c-Met IHC have 3+ membrane or membrane+cytoplasmic staining.

c-Met intermediate expression is defined by ≥25% to <50% of the neoplastic cells from tumor tissue assessed by c-Met IHC have 3+ membrane or membrane+cytoplasmic staining.

c-Met high expression is defined by ≥50% of the neoplastic cells from tumor tissue assessed by c-Met IHC have 3+ membrane or membrane+cytoplasmic staining.

In certain embodiments, subjects having non-squamous NSCLC exhibiting c-Met negative expression are excluded from treatment with Teliso-V.

In some embodiments, patients selected for treatment with Teliso-V have non-squamous NSCLC having c-Met positive expression.

In some embodiments, patients selected for treatment with Teliso-V have a non-squamous NSCLC having c-Met intermediate expression.

In some embodiments, patients selected for treatment with Teliso-V have a non-squamous NSCLC having c-Met high expression.

6.4.3.1. IHC Determination of c-Met Expression c-Met specific immunohistochemistry (c-Met IHC) is contemplated as a means for determining c-Met-overexpression in the NSCLC of a candidate patient for treatment with Teliso-V. For this purpose, IHC scores of 0, 1+, 2+, and 3+ describe the visual c-Met staining intensities for individual neoplastic cells from tumor tissue, according to:

0=no staining
1+=weak staining
2+=moderate staining
3+=strong staining

Typically, there are ~100 human NSCLC cells in a 20× fixed field. IHC scoring as used herein refers to the intensity of membranous c-Met staining or the intensity of membrane+cytoplasmic c-Met staining.

In some embodiments, patients having NSCLC selected for treatment with Teliso-V have c-Met-overexpression determined by IHC, wherein said IHC comprises the steps of:
1) staining the membrane or membrane+cytoplasm of neoplastic cells of the NSCLC with a diagnostic reagent specific for c-Met, and
2) scoring the intensity of membrane or membrane+ cytoplasm staining, wherein IHC scoring is performed using values scaled to correspond to a score of 0, a score of 1+, a score of 2+, and/or a score of 3+, wherein said score of 0 corresponds to a minimal visual membrane or membrane+cytoplasm staining intensity of at or about the intensity of a negative control, said score of 3+ corresponds to a maximum visual membrane or membrane+cytoplasm staining intensity of at or about the intensity of a positive control, and said scores of 1+ and 2+ correspond to visual membrane or membrane+cytoplasm staining intensities of at or about ⅓, and of at or about ⅔, of the maximum visual membrane or membrane+cytoplasm staining intensity of the positive control, respectively.

Details on how to visualize and determine the level of c-Met overexpression are presented below and in Example 1. For purposes of this application, including the claims, the particular assay used in Example 1 is referred to as the "c-Met Teliso-V staining protocol." Briefly, a c-Met IHC staining assay for c-Met overexpression was developed using the Ventana c-Met CONFIRM (SP44) kit (Catalog Number 790-4430), and is contemplated for use in the selection of patients for treatment with Teliso-V. In this assay, tissue samples are stained with the Ventana anti-c-Met antibody and then scored by determining the percentages of neoplastic cells of the tumor tissue that stain at certain intensity levels from weak/low to strong/high (i.e., 0, 1+, 2+, to 3+). This assay produces staining of the c-Met protein both in the cytoplasm and in the cell membrane, of which the membranous staining or the membrane+cytoplasmic staining is used in IHC score determination.

If different c-Met IHC scoring results are obtained with different IHC methods, then the c-Met IHC scoring results determined with the methods described in Example 1 are those to be used in determining whether a particular embodiment falls within the scope of the embodiments. For example, for evaluating expression of the c-Met protein one would use the "c-Met Teliso-V staining protocol." If the reagents used in this protocol are no longer available, another FDA-approved protocol for assessment of c-Met expression levels by IHC can be used.

IHC Detection of c-Met c-Met IHC detection is a diagnostic technique providing for visualization of c-Met antigens after their localization with a primary anti-c-Met antibody. In some embodiments, the primary anti-c-Met antibody is selected from a mouse IgG, mouse IgM or a rabbit antibody. In some embodiments, IHC detection comprises direct visualization of a primary anti-cMet antibody. In some embodiments, IHC detection comprises indirect visualization of a primary anti-cMet antibody. In some embodiments, indirect visualization comprises a secondary antibody specific for the species of primary anti-cMet antibody. In some embodiments, indirect visualization further comprises a tertiary antibody that binds to the secondary antibody, wherein the tertiary antibody is conjugated to at least one enzyme. In some embodiments, indirect visualization further comprises a chromogen having a substrate specific for the at least one enzyme of the tertiary antibody. In some embodiments, the chromogen produces a detectable precipitate, preferably wherein the precipitate is detectable by visualization and/or colorimetric shift. In certain embodiments, the substrate is hydrogen peroxide. In certain embodiments, the chromogen is 3, 3'-diaminobenzidine tetrahydrochloride (DAB).

In some embodiments, expression of c-Met is determined using an OptiView DAB IHC Detection Kit (Ventana Catalog Number 760-700). Optiview kits use an indirect method to visualize specific mouse and rabbit primary antibodies bound to an antigen by depositing a brown colored precipitate.

Preparation of Tissue for IHC Detection

In some embodiments, IHC detection of c-Met expression comprises the step of staining tumor tissue that is frozen, formalin-fixed, and/or paraffin-embedded. In some embodiments, tumor tissue staining is performed via slide staining device. As contemplated, such a slide staining device automates a slide staining step, for example, washing the slide to remove unbound material after an antibody incubation step and/or applying a coverslip to the slide. In some embodiments, the slide staining device is a VENTANA® slide staining device. In some embodiments, the slide staining device is a VENTANA® BenchMark Series instrument (i.e., a BenchMark ULTRA IHC/ISH System).

Formalin-fixed, paraffin-embedded tissues are suitable for use with OptiView DAB IHC Detection Kit and VENTANA® BenchMark Series instruments. In some embodiments, preparation of tumor tissue for IHC detection comprises the step of contacting the tumor tissue with a fixative. In some embodiments, a formalin-based fixative is used, e.g., 10% neutral buffered formalin (NBF).

To minimize variability of visualization results, tumor tissue section thickness, fixation type and duration may be optimized. In some embodiments, tumor tissue sections are of a thickness of about 2 µm to about 6 µm. In some embodiments, tumor tissue sections are of a thickness of about 2, about 3, about 4, about 5, or about 6 µm. Slide heating is contemplated for drying tumor tissue sections after slide mounting, or to enhance tissue adhesion to the glass microscope slides. In some embodiments, a slide containing the tumor tissue section is heated, preferably it is baked. In some embodiments, the slides are heated for between 2 and 24 hours at 60° C.±5° C. Avoid excessive heating of the tumor tissue, as it may decrease antigen availability. In some embodiments, the slides are contacted with cold acetone (i.e., 4-8° C.) for ten minutes. In some embodiments, the slides are air dried for at least 30 minutes following contact with cold acetone, preferably overnight.

Controls

A positive tissue control is contemplated as being run with the c-Met IHC staining procedure. The positive tissue control can be, for example, a tumor tissue or non-neoplastic gallbladder tissue. Some or all of a positive tissue control will feature strong staining. A positive tissue control may contain both positive and negative staining, and serve as both the positive and negative control tissue. Cellular components that do not stain should demonstrate an absence of specific staining, which provides an indication of background staining. In some embodiments, the same tissue used for the positive tissue control is used as the negative tissue control. In some embodiments, the tissue for the positive or negative control is prepared in a manner identical to the test tissue.

A negative control aids interpretation of c-Met IHC scores. In some embodiments, a negative reagent control is used in place of the primary anti-c-Met antibody to evaluate nonspecific staining. In some embodiments, the negative control reagent is the diluent alone. In preferred embodiments, the incubation period for the negative reagent control equals the incubation period for the primary antibody.

Prior to initial use of a primary anti-cMet antibody in the methods of treatment described herein, the specificity of the antibody must be verified by testing performance on a series of tissues with known immunohistochemistry performance characteristics for c-Met expression, with respect to positive and negative tissues.

Interpretation of Results

The OptiView DAB IHC Detection Kit (Ventana Catalog Number 760-700) as contemplated for the invention causes a brown colored reaction product to precipitate at or about the c-Met antigen sites localized by the primary anti-c-Met antibody.

In some embodiments, detection of c-Met expression by IHC is performed by a qualified pathologist experienced in immunohistochemical procedures. In some embodiments, detection of c-Met expression occurs after the step of evaluating the positive and negative controls. Staining of negative reagent controls are noted, and these results compared to the stained material to verify that the visualization observed is not due to nonspecific interactions. Positive tissue control is examined to verify proper functioning of reagents. If the positive tissue control fails to demonstrate positive staining, results with the test specimens should be considered invalid for purposes of the methods of treatment disclosed herein. Negative tissue control should be examined after the positive tissue control to verify the specific labeling of the target antigen by the primary antibody. The absence of specific staining in the negative tissue control confirms the lack of anti-c-Met primary antibody binding. If specific staining occurs in the negative tissue control, results with the test specimens should be considered invalid for the purposes of the methods of treatment disclosed herein. Nonspecific staining may have a diffuse appearance. Sporadic light staining may also indicate excessive formalin fixation of cells. Necrotic or degenerated cells may stain nonspecifically.

In some embodiments of the methods of treatment with Teliso-V, intact cells of the NSCLC tissue are assayed for c-Met expression by IHC. Tissue sample biopsies, resections or cytology samples of the patient are examined after controls, as described herein, with staining intensity assessed within the context of any non-specific background staining of the controls (i.e., the negative tissue control, and the negative reagent control.) The morphology of cells of the NSCLC tissue sample should also be examined by a qualified pathologist experienced in immunohistochemical procedures. In some embodiments, the NSCLC tissue sample is contacted with a hematoxylin or eosin stain.

Automated Slide Staining

In some embodiments, patients having NSCLC selected for treatment with Teliso-V have c-Met overexpression determined for tumor tissue by c-Met IHC assay, wherein the c-Met IHC assay is the c-Met Teliso-V Staining Protocol. In some embodiments, the c-Met IHC assay is performed on an automated slide stainer. In some embodiments, the c-Met IHC assay comprises the steps of: 1) applying a bar code label to a slide having tumor tissue, wherein the bar code corresponds to one or more automated IHC protocols to be performed by an automated slide stainer; 2) loading a primary anti-c-Met antibody, at least one negative reagent control, and/or one or more detection reagents onto the automated slide stainer; 3) loading at least one slide having tumor tissue onto the automated slide stainer; 4) running the automated slide stainer according to the one or more automated IHC protocols, thereby staining c-Met tumor tissue on the slides; and 5) detecting and scoring the c-Met IHC staining of the slides. In some embodiments, the automated slide stainer is a Ventana BenchMark series instrument, optionally a Ventana Benchmark Ultra automated staining instrument. In some embodiments, the bar code corresponds to an SP44 IHC protocol. In some embodiments, the SP44 IHC protocol is selected from a Deparaffinization protocol, a Cell Conditioning protocol (i.e., Ventana Catalog No. 950-224), an Antibody protocol (i.e., for SP44: Ventana Catalog No. 790-4430, or for Rabbit Monoclonal Negative Control Ig: Ventana Catalog No. 790-4795), a Detection protocol (i.e., for OptiView DAB IHC Detection Kit: Ventana Catalog No. 760-700), or a Counterstain protocol (i.e., for hematoxylin II: Ventana Catalog No. 790-2208, or for bluing reagent: Ventana Catalog No. 760-2037). In some embodiments, the primary anti-cMet antibody is the SP44 antibody. In some embodiments the one or more negative reagent controls is a negative control immunoglobulin. In some embodiments, the one or more detection reagents are from an OptiView detection kit, optionally selected from Reaction Buffer (Ventana Catalog No. 950-300), Ultra Liquid Coverslip (Ventana Catalog No. 650-210), or EZ Prep (Ventana Catalog No. 950-102).

7. EXAMPLES

The following Examples, which highlight certain features and properties of the exemplary embodiments of the antibodies and binding fragments described herein are provided for purposes of illustration.

7.1. Example 1 c-Met Teliso-V Staining Protocol

The following assay was developed to determine the suitability of a candidate patient having NSCLC for selection to be treated with Teliso V. An IHC staining assay for determining c-Met-overexpression was developed using the Ventana c-Met CONFIRM (SP44) kit and c-Met SP44 OptiView IHC Staining Assay.

This assay and aspects of its protocol are suitable for use in the pre-screening of patients having NSCLC for treatment with telisotuzumab vedotin, or treatment with a biological product having biosimilarity to telisotuzumab vedotin.

7.1.1. Materials and Methods

Specimen Preparation

Routinely processed, formalin fixed, paraffin embedded tumor tissues were thin-sectioned at about 4 microns, and floated onto positively charged glass slides. Tissue was fixed using 10% neutral buffered formalin. Slides were stained immediately after sectioning, to avoid time-dependent reduction of antigenicity.

Immunohistochemistry Procedure

Immunohistochemistry (IHC) for c-Met was performed on the Ventana BenchMark Ultra automation staining platform. The primary antibody used was the anti-c-Met clone SP44. The OptiView DAB IHC Detection Kit was used for indirect visualization of the primary antibody for c-Met expression determination.

The procedures for staining on the Ventana Benchmark instrument included the steps of:

1) applying a slide bar code label corresponding to the SP44 IHC protocol to be performed (TABLE 3);
2) loading the SP44 antibody, Rabbit Monoclonal Negative Control Ig, and OptiView detection kit dispensers onto the reagent tray; optionally checking bulk fluids (TABLE 4) and empty waste;
3) loading slides to be examined onto the automated slide stainer; and
4) starting the staining run on the Ventana instrument.

At the completion of the Ventana instrument run, slides were removed and submerged in a mild detergent to remove the oil coverslip. Slides were rinsed thoroughly with distilled water, and then dehydrated through graded series of alcohols. Slides were cleared in xylene and a coverslip applied using a permanent mounting media.

TABLE 3 c-Met SP44 OptiView IHC Staining Protocol

| PROCEDURE TYPE | METHOD | VENTANA CATALOG # |
|---|---|---|
| Deparaffinization | Selected | N/A |
| Cell Conditioning | Standard Cell Conditioning 1 | 950-224 |
| Antibody | SP44 or Rabbit Monoclonal Negative Control Ig (16 minutes) | 790-4430 or 790-4795 |
| Detection | OptiView DAB IHC Detection Kit (8 minutes) | 760-700 |
| Counterstain | Hematoxylin II (4 minutes) | 790-2208 |
| Counterstain | Bluing Reagent (4 minutes) | 760-2037 |

TABLE 4

Bulk fluids for c-Met SP44 OptiView Staining Protocol

| BULK REAGENTS | VENTANA CATALOG # |
|---|---|
| Reaction Buffer | 950-300 |
| Ultra Liquid Coverslip | 650-210 |
| EZ Prep | 950-102 |

7.1.2. Results and Analysis

Slide Evaluation and Interpretation

Neoplastic cells stained with the c-MET SP44 OptiView IHC assay were evaluated visually for positivity based on the intensity of the diaminobenzidine (DAB) signal. The IHC signal may be distributed homogeneously throughout the neoplasm or distributed heterogeneously with few cells staining positive.

c-MET (SP44) IHC staining in NSCLC showed that membrane staining is often accompanied by cytoplasmic staining (i.e., both cytoplasmic and membranous). When the staining pattern presents as membranous, it can be either circumferential (the predominant showing), or partial (i.e., basolateral staining in adenocarcinomas). Both membranous and cytoplasmic staining showed a range of intensity varying from no staining (IHC score of 0) to strong staining (IHC score of 3+). Cytoplasmic staining was generally lower in intensity than membranous staining. Some situations showed cytoplasmic staining having a similar intensity to membrane staining (i.e., especially in cases with moderate or strong intensities), and careful differentiation between membranous from cytoplasmic staining was required.

Normal lung, bronchial epithelium, pneumocytes and alveolar macrophages generally did not show strong levels of c-Met-overexpression. However, bronchial epithelium and pneumocytes stained with an IHC score of 2+ to 3+ in a basolateral pattern. Staining in normal cellular components may be suitable for internal controls of the method. Representative staining intensity guidelines for cytoplasmic staining and membranous staining are shown in TABLE 5 and TABLE 6, respectively.

TABLE 5

Cytoplasmic staining intensities for c-Met on non-squamous NSCLC

Figure 1A:
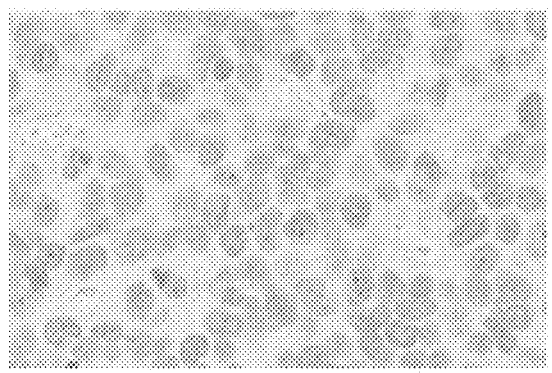
FIGS. 1A-1D show representative cytoplasmic staining intensities for c-Met on non-squamous NSCLC. SP44 OptiView IHC Cytoplasmic Staining Intensities (20×) of IHC score of 0 (FIG. 1A); 1+ (FIG. 1B); 2+ (FIG. 1C); and 3+ (FIG. 1D).
Figure 1B:
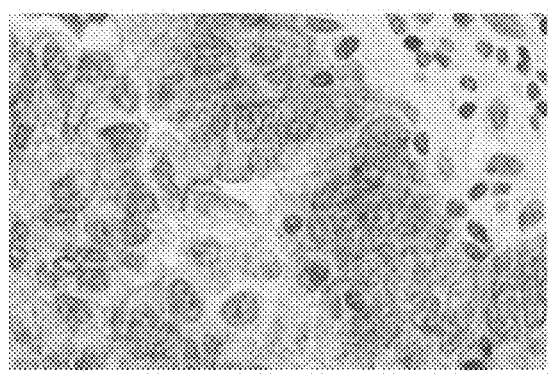
Figure 1C:
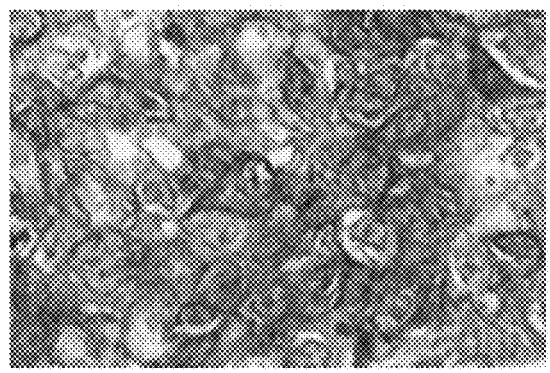
Figure 1D:
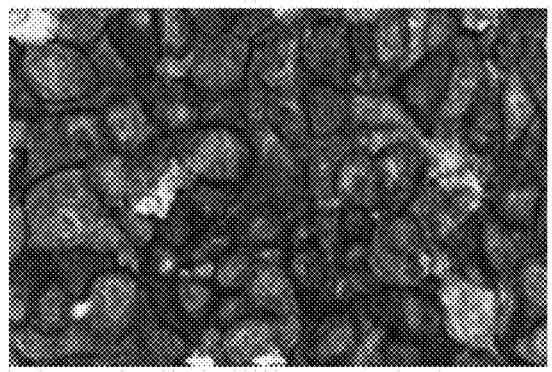

| Staining Description | Intensity | Exemplary (20×) Cytoplasmic Staining for Non-Sq NSCLC |
| --- | --- | --- |
| No staining or non-specific background staining | No staining | FIG. 1A |
| Pale/light brown or tan in color above the level of non-specific background staining. Often requires high magnification (20× or 40×) to view staining | Weak/1+ staining | FIG. 1B |
| Medium brown in color with higher intensity than 1+. Often seen at low magnification (4× or 10×) | Moderate/2+ staining | FIG. 1C |
| Dark brown often with a black hue. Easily visualized at low magnification (2× or 4×) | Strong/3+ staining | FIG. 1D |

TABLE 6

Membranous staining intensities for c-Met on non-squamous NSCLC

| Staining Description | Intensity | Exemplary (20×) Membranous Staining for Non-Sq NSCLC |
| --- | --- | --- |
| No staining or non-specific background staining | No staining | FIG. 2A |
| Pale/light brown or tan in color above the level of non-specific background staining. Often requires high magnification (20× or 40×) to view staining | Weak/1+ staining | FIG. 2B |
| Medium brown in color with higher intensity than 1+. Often seen at low magnification (4× or 10×) | Moderate/2+ staining | FIG. 2C |
| Dark brown often with a black hue. Easily visualized at low magnification (2× or 4×) | Strong/3+ staining | FIG. 2D |

Scoring Algorithm c-Met-stained tumor tissue IHC slides were evaluated for membrane staining on neoplastic cells. Non-squamous NSCLC samples with <25% 3+ membrane staining were considered c-Met negative. Non-squamous NSCLC samples with ≥25% of viable tumor cells exhibiting 3+ membrane staining were considered c-Met positive. Non-squamous NSCLC samples with ≥25% to <50% of viable tumor cells exhibiting 3+ membrane staining were considered c-Met Intermediate. Non-squamous NSCLC samples with ≥50% of viable tumor cells exhibiting 3+ membrane staining were considered c-Met High. TABLE 7 shows different intensities of membrane staining and positive/negative status per scoring algorithm.

TABLE 7 c-Met Scoring Algorithm-Non-Squamous NSCLC: Representative cutoffs for c-Met positive and c-Met high

| c-MET IHC Staining | Interpretation | Exemplary (20×) Representative Images |
| --- | --- | --- |
| <25% of neoplastic cells from tumor tissue have 3+ membrane staining | Negative | FIG. 3A1-3A3 |
| ≥25% of neoplastic cells from tumor tissue have 3+ membrane staining | c-Met Positive | FIG. 3B1-3B3 |
| ≥50% of neoplastic cells from tumor tissue have 3+ membrane staining | c-Met High | FIG. 3C1-3C3 |

7.1.3. Validation Across IHC Platforms

Comparison of c-Met IHC Assays: SP44 "Ultraview" to SP44 "Optiview"

An analytical method comparison between SP44 Ultraview and SP44 OptiView on a large cohort of commercial NSCLC tissues was performed (FIG. 4). These results show that SP44 OptiView IHC assay selected for a similar patient population as SP44 Ultraview at the ≥25% 3+ membrane staining cutoff. The overall percent agreement at this cutoff between the two assays was 93%. The first in human phase I clinical trial enrolled patients with an H-score of 150 using the SP44 UltraView assay. Upon re-scoring of the slides, the optimal cutoff utilizing the SP44 Ultraview IHC assay was ≥25% 3+ with a best overall response of 56%. The best overall response for the OptiView IHC assay utilizing the phase I data through statistical modeling was 52% (FIG. 5).

Similarly, the SP44 OptiView IHC assay showed a 99% overall percent agreement to the SP44 Ultraview IHC assay at the ≥50% 3+ membrane staining cutoff (FIG. 6). The first in human phase I clinical trial enrolled patients with an H-score of 150 using the SP44 UltraView assay. Upon re-scoring of the slides, the SP44 Ultraview IHC assay showed a best overall response of 67% at the ≥50% 3+ membrane staining cutoff. The best overall response for the OptiView IHC assay utilizing the phase I data through statistical modeling was 63% (FIG. 6).

7.2. Example 2: Phase 2, Open-Label Safety and Efficacy Study of Telisotuzumab Vedotin (ABBV-399) in Subjects with Previously Treated c-Met+ Non-Small Cell Lung Cancer

7.2.1. Summary

An ongoing Phase 2 open-label study (clinicaltrials.gov Identifier NCT03539536, incorporated by reference) is evaluating the safety and efficacy of telisotuzumab vedotin in subjects with previously treated c-Met+ non-small cell lung cancer. This is a Phase 2 multicenter, non-randomized, single-arm, adaptive study evaluating the efficacy, safety, pharmacokinetics and pharmacodynamics of telisotuzumab vedotin in subjects with c-Met+ locally advanced or metastatic NSCLC with c-Met overexpression per designated IHC laboratory assay specification using pre-specified c-Met positive cutoffs. This study consists of 2 stages and is designed to identify the target NSCLC population(s) that overexpress c-Met best suited for telisotuzumab vedotin therapy in the second-line or third-line setting (Stage 1) and then to expand the group(s) to further evaluate efficacy in the selected population(s) (Stage 2). Study design is shown in FIG. 7. The data presented herein correspond to Interim Analysis 3 of the Stage 1, which shows favorable results for telisotuzumab vedotin in a verified clinical setting in select patient cohorts.

Subjects were required to have known EGFR status and c-Met+ NSCLC as assessed by a designated IHC laboratory. Subjects were required to submit archival or fresh tumor material for assessment of c-Met overexpression during the pre-screening period.

In Stage 1, up to approximately 150 efficacy evaluable c-Met+ NSCLC subjects are treated with telisotuzumab vedotin monotherapy across three cohorts. The primary efficacy analysis comprises the subset of subjects with measurable disease per Independent Central Review (ICR).

Non-squamous EGFR wild type NSCLC (N=up to approximately 60)

Non-squamous EGFR mutant NSCLC (N=up to approximately 60)

Squamous NSCLC (N=up to approximately 30)

For enrollment of the non-squamous cohorts c-Met+ was defined as ≥25% of neoplastic cells from tumor tissue have membrane staining at 3+ intensity by immunohistochemistry (IHC). Each c-Met+ non-squamous cohort was further subdivided into a c-Met intermediate group (defined as ≥25% to <50% of neoplastic cells from a tumor have membrane staining at 3+ intensity by IHC) and a c-Met high group (defined as ≥50% of neoplastic cells from a tumor have membrane staining at 3+ intensity by IHC). The squamous cohort c-Met+ cutoff is ≥75% of neoplastic cells from tumor tissue have membrane staining at any intensity by IHC (i.e., 1+ or greater).

NSCLC subjects are treated with telisotuzumab vedotin monotherapy across the following 5 groups over the non-squamous and squamous cohorts, with a maximum of 30 subjects per group for efficacy evaluation in Stage 1 of the study:

Non-squamous EGFR wild type NSCLC c-Met high (N=up to approximately 30)

Non-squamous EGFR wild type NSCLC c-Met intermediate (N=up to approximately 30)

Non-squamous EGFR mutant NSCLC c-Met high (N=up to approximately 30)

Non-squamous EGFR mutant NSCLC c-Met intermediate (N=up to approximately 30)

Squamous NSCLC c-Met+ (N=up to approximately 30)

In Stage 2, the efficacy of telisotuzumab vedotin will be further evaluated as monotherapy in the specific group(s) that show promising results during Stage 1 and further evaluated in a single-arm expansion cohort.

All subjects are to receive telisotuzumab vedotin monotherapy until until disease progression or study discontinuation criteria are met.

In Stage 1, efficacy will be formally evaluated in interim analyses conducted after approximately every additional 30 c-Met+ efficacy evaluable subjects with measurable disease per ICR are enrolled and have at least 12 weeks follow-up across cohorts/groups open for enrollment. The number of subjects triggering interim analyses may be adjusted as needed as cohorts/groups graduate to Stage 2, are terminated, or group enrollment caps are reached.

The ORR for each group will be additionally assessed using a Bayesian hierarchical model allowing for borrowing of information across groups where the extent of borrowing will depend on the similarity of observed efficacy between the groups. The model will account for effects of disease histology and c-Met expression level. The decision to stop the enrollment of a group for futility in Stage 1, or moving a group to the expansion cohort in Stage 2, will be based on the estimated posterior probabilities of success by comparing it with the lower and upper decision thresholds. The posterior probability of success is defined as the posterior probability of the ORR exceeding 25%. The lower decision threshold is defined as 10% and the upper decision threshold is defined as 70%. The above analysis will also be performed at the cohort level.

For each interim analysis, decision-making will start with at least 10 efficacy evaluable subjects enrolled under one group or at least 15 efficacy evaluable subjects enrolled in one cohort (i.e., non-squamous EGFR wildtype, non-squamous EGFR mutant). When the posterior probability of success for a specific group exceeding 25% falls below 0.10, it is considered futile. On the other hand, if the same posterior probability estimate is high (exceeds 0.70), then the group may expand, i.e., "graduate" to Stage 2 expansion. If it is in-between but the posterior probability of success for the cohort that the group belongs to meets the expansion criteria, the group may be allowed for expansion as well. For all other scenarios, enrollment for the group will continue unless the sample-size cap of approximately 30 is reached. Therefore, multiple groups can "graduate" from Stage 1 at different interim time-points and be included in the single Stage 2 expansion for confirmation of efficacy. One possible eventuality for a group in Stage 1 is that the evidence is inconclusive in terms of futility or expansion when enrollment is capped (inconclusive and capped). There is also a fourth possibility for groups to remain inconclusive and the enrollment cap has not been reached after a reasonable amount of time (i.e., reasonable number of interim assessments) compared to the other groups.

In Stage 2, the efficacy of telisotuzumab vedotin will be further evaluated as monotherapy in the specific group(s) that show promising results during Stage 1 and further evaluated in a single-arm expansion cohort with total enrollment of up to approximately 160 subjects.

7.2.2. Objectives

The objectives of the present study were to evaluate the safety and efficacy of telisotuzumab vedotin in cohorts (based on histopathology and epidermal growth factor receptor [EGFR] mutation) and subgroups (based on c-Met expression) of patients with previously treated, locally advanced or metastatic non-small cell lung cancer (NSCLC) and c-Met protein overexpression (c-Met+).

The primary objective was to determine the overall response rate (ORR) of telisotuzumab vedotin in subjects with c-Met+ NSCLC per independent central review (ICR) in patients with ≥12 weeks of follow-up.

The secondary objectives were to determine:
Duration of response (DoR)
Disease control rate (DCR)
Progression-free survival (PFS)
Overall survival (OS)
Safety and tolerability

7.2.3. Patient Selection: Main Criteria for Inclusion/Exclusion

Some main criteria for inclusion for the telisotuzumab vedotin Phase 2, non-randomized, single-arm, adaptive study:
Subject must be ≥18 years of age
Subject must have locally advanced or metastatic NSCLC with Subjects with measurable disease per Response Evaluation Criteria In Solid Tumors (RECIST) v1.1.
Subject must have c-Met+ NSCLC as assessed by a designated IHC laboratory.
Subjects with histologically documented non-squamous NSCLC with known EGFR status (wild type or mutant) or histologically documented squamous NSCLC.
Received ≤2 prior lines of systemic therapy in the locally advanced or metastatic setting, including cytotoxic chemotherapy (1 line), immunotherapy, and therapy targeting driver gene alterations (if eligible).
Subjects have an Eastern Cooperative Oncology Group (ECOG) Performance Status of 0 or 1.
Some main criteria for exclusion:
Subjects must not have received prior c-Met-targeted antibody therapies or have history of major immunologic reactions to any IgG-containing agent.
Subjects must not have adenosquamous histology.
Subjects must not have history of interstitial lung disease or pneumonitis requiring systemic steroid treatment.
Uncontrolled central nervous system metastases unless patient has received definitive therapy, is asymptomatic, and is off systemic steroids and anticonvulsants at least 2 weeks prior to the first dose of telisotuzumab vedotin.
Subject must not have had major surgery within 21 days prior to the first dose of ABBV-399.
Subject must not have unresolved clinically significant adverse events of Grade≥2 from prior anticancer therapy, except for alopecia or anemia.
Subjects must not have any evidence of pulmonary fibrosis or pneumonitis, or history of any interstitial disease lung requiring systemic steroid treatment within 3 months of the planned first dose of telisotuzumab vedotin.
Subjects must not have received any live vaccine within 30 days of the first dose of investigational product.
Subjects who have progressed on systemic cytotoxic therapy (or are ineligible for systemic cytotoxic chemotherapy) and an immune checkpoint inhibitor (as monotherapy or in combination with systemic cytotoxic chemotherapy, or ineligible), and prior anti-cancer therapies targeting driver gene alterations (if applicable). Subjects must not have received radiation therapy to the lungs <6 months prior to the first dose of telisotuzumab vedotin. Subjects must have received no more than 2 lines of prior systemic therapy (including no more than 1 line of systemic cytotoxic chemotherapy) in the locally advanced or metastatic setting. Multiple lines of TKIs targeting the same TK count as 1 line of therapy for the purposes of this eligibility criterion.
Treatment with any of the following therapies within the noted time intervals is excluded prior to the first dose of telisotuzumab vedotin:
Within 4 weeks (28 days): systemic cytotoxic chemotherapy; small molecule targeted agents with half-life≥7 days; monoclonal antibodies, antibody-drug conjugates, radioimmunoconjugates, or T-cell or other cell-based therapies.
Within 1 week (7 days): herbal therapy or strong cytochrome P450 3A4 (CYP3A4) inhibitors.
Within 2 weeks (14 days): small molecule targeted agents with half-life<7 days; radiation not involving the thoracic cavity.
Treatment with any of the following therapies does not require a washout period:
Palliative radiation therapy for bone, skin, or subcutaneous metastases for 10 fractions or less; see below for CNS metastases.
Subjects currently treated with EGFR TKIs.
Subjects with metastases to the central nervous system (CNS) are eligible only after definitive therapy (such as surgery or radiotherapy) is provided and:
There is no evidence of progression of CNS metastases at least 4 weeks after definitive therapy.
They are asymptomatic and off systemic steroids and anticonvulsants for at least 2 weeks prior to first dose of telisotuzumab vedotin.
Subjects must not have a history of other malignancies except:
Malignancy treated with curative intent and with no known active disease present for ≥2 years before the first dose of study drug and felt to be at low risk for recurrence by investigator.
Adequately treated non-melanoma skin cancer or lentigo maligna without evidence of disease.
Adequately treated carcinoma in situ without current evidence of disease.

Subjects must not have a clinically significant condition(s) including, but not limited to, the following:
Grade≥2 edema or lymphedema.
Grade≥2 ascites or pleural effusion.
Grade≥2 neuropathy or a history of Grade≥3 neuropathy.
Active uncontrolled bacterial or viral infection.
New York Heart Association Class≥III congestive heart failure.
Unstable angina pectoris or cardiac arrhythmia.

7.2.4. Dosing Regimen

Telisotuzumab vedotin was administered at a dosage of 1.9 mg/kg via intravenous (IV) infusion over a 30±10 minutes period every 14 days (once per cycle) until subject experienced disease progression or met study discontinuation criteria.

7.2.5. Assessments

Eligibility criteria, medical and cancer history were reviewed at Pre-Screening for c-Met. c-Met overexpression was determined by a central c-Met IHC assay (Ventana; Tucson, AZ) for non-squamous: c-Met staining on ≥25% of neoplastic cells from tumor tissue at 3+ intensity; c-Met intermediate: ≥25% to <50% staining at 3+ intensity; c-Met high: ≥50% staining at 3+ intensity; squamous: c-Met staining on ≥75% of neoplastic cells from tumor tissue at 1+ intensity (i.e., the c-Met Teliso-V staining protocol as described in Example 1).

Study visits and evaluations were performed at at Pre-Screening, Screening, Day 1 and 8 of the first cycle, and Day 1 of each subsequent cycle. Assessments included limited physical examination, hematology, urinalysis, and chemistry tests prior to all study drug dosing and at Final Visit. ECGs and ECOG Performance Status were collected at Screening, Cycle 1 Day 1, Cycle 2 Day 1 and at the Final Visit. Adverse events, laboratory data and vital signs were assessed throughout the study.

Baseline radiographic tumor assessments with CT (or MRI) of the head, chest, abdomen, and pelvis were obtained no more than 28 days prior to Cycle 1 Day 1. CT scan (or MRI) were repeated approximately every 6 weeks after start of therapy to evaluate the extent of tumor burden. Radiographic tumor assessments continued until disease progression was documented by imaging, a new anti cancer therapy was started, or death or withdrawal of consent. Response evaluation was based on RECIST version 1.1. Evidence of clinical disease progression was evaluated at each visit.

7.2.6. Criteria for Evaluation

Criteria and statistical methods for efficacy and safety evaluation are shown below in TABLE 8:

TABLE 8

Criteria and statistical methods for efficacy and safety evaluation

| Criteria |
| --- |
| Efficacy: The efficacy endpoints include objective response rate (ORR) (determined using RECIST version 1.1), duration of overall response (DOR), disease control rate (DCR), progression-free survival (PFS), overall survival (OS). Radiologic assessments consisted of CT scans (or MRI in subjects who cannot tolerate contrast) and were performed approximately every 6 weeks after start of therapy to evaluate the extent of tumor burden. Radiographic tumor assessments were continued until disease progression was documented by imaging, a new anti-cancer therapy was started, death or withdrawal of consent. Response evaluations were based on Response Evaluation Criteria in Solid Tumors (RECIST) 1.1. Eisenhauer EA, Therasse P, Bogaerts B, et al. New response evaluation criteria in solid tumors: Revised RECIST guideline (version 1.1). Eur J Cancer. 2009;45:228-47. |
| Safety: Adverse events, laboratory profiles, physical exams, and vital signs were assessed throughout the study. Adverse events were graded according to the National Cancer Institute Common Terminology Criteria for Adverse Events (NCI CTCAE), version 4.03. |
| Statistical Methods |
| Efficacy: Analyses of ORR, DOR, DCR, PFS, and OS were performed for all evaluable dosed subjects. |
| Safety: The safety of ABBV-399 was assessed by evaluating the study drug exposure, adverse events, serious adverse events, all deaths, as well as changes in laboratory determinations and vital sign parameters. |

Efficacy

All efficacy analyses were exploratory in nature. The exploratory efficacy endpoints included objective response rate (ORR), duration of overall response (DOR), disease control rate (DCR), progression-free survival (PFS), and overall survival (OS) determined using RECIST version 1.1.

Objective Response Rate

Objective response rate (ORR) was defined as the proportion of subjects with a confirmed complete response (CR) or confirmed partial response (PR) based on RECIST, version 1.1. Tumor assessments were performed at baseline and every 6 weeks according to RECIST v1.1. The ORR for each treatment cohort was estimated with all the sites pooled.

The interim analysis was conducted using a Bayesian hierarchical model to assess the ORR for each group, with the threshold for advancement to Stage 2 being a posterior probability of at least 70% that the true ORR is >25%. Patients who experienced clinical progression or death prior to the first postbaseline tumor assessment were considered non-responders Duration of Overall Response DoR was defined for confirmed responders as the time from the subject's initial response (CR or PR) to the first occurrence of radiographic progression determined by an independent central review or death from any cause ponders. DoR time for responders who have not progressed or died was censored at the time of last tumor assessment.

Disease Control Rate

DCR was defined as the percentage of subjects with best overall response of confirmed CR, confirmed PR, or stable disease (SD) for at least 12 weeks (2 planned tumor assessments) following first dose of telisotuzumab vedotin, based on RECIST, version 1.1.

Progression-Free Survival

PFS was defined as the time from the subject's first dose of study drug until the first occurrence of radiographic progression determined by an independent central review or death from any cause. PFS for subjects who have not progressed or died was censored at the time of the last tumor assessment.

Overall Survival

OS was defined as the time from the subject's first dose of study drug until death from any cause. Subjects who have not died were censored at the last date the subject is known to be alive.

Quality of Life

Quality of life was assessed by electronic PROs (EORTC QLQ-C15-PAL, EORTC QLQ-LC13, EORTC QLQCIPN20, EQ-5D-5L).

Safety

Safety and tolerability was assessed by evaluating adverse events (AEs) and changes in laboratory data and vital signs for the entire study duration. AE severity was graded according to the National Cancer Institute Common Terminology Criteria for Adverse Events v4.03. Treatment-emergent AEs (TEAEs) were those that occurred during treatment or up to 30 days after discontinuation of telisotuzumab vedotin.

Safety analyses included all patients who received ≥1 dose of telisotuzumab vedotin. Efficacy analyses included patients enrolled ≥12 weeks prior to the data cutoff date who received ≥1 dose of telisotuzumab vedotin and ≥1 post-baseline tumor assessment (or had clinical evidence of progression or died prior to post-baseline assessment).

Pharmacokinetics and Pharmacodynamics

Pharmacokinetic samples were obtained at visits and evaluations. Serum samples for assay of telisotuzumab vedotin conjugate and total ABT-700, and plasma samples for free MMAE concentrations were collected at specified time-points. Serum samples for assay of anti-drug antibodies (ADA) and neutralizing anti-drug antibodies (nAb) were collected at specified timepoints. Values for the PK parameters of telisotuzumab vedotin conjugate, total ABT-700, and MMAE, including maximum observed concentration (Cmax), the time to Cmax (peak time, Tmax), the area under the concentration-time curve (AUC) were determined using noncompartmental methods when the data warranted.

A nonlinear mixed-effects modeling approach was used to estimate the population PK parameters of telisotuzumab vedotin conjugate and MMAE such as clearance (CL) and volume (V).

c-Met Biomarkers

Subjects were screened prospectively for c-Met protein overexpression on their archival tumor tissue or fresh tumor tissue using a c-Met IHC assay to determine eligibility (Example 1 shows an appropriate IHC assay for pre-screening patients).

Biospecimens (plasma, tumor material, whole blood) were collected at specified time points throughout the study to evaluate known and/or novel disease-related or telisotuzumab vedotin-related biomarkers in circulation or in tumor tissue.

Recist (Version 1.1) Criteria for Tumor Response

Response criteria were assessed using RECIST (version 1.1). Changes in the measurable lesions over the course of therapy were evaluated using the criteria listed below.

a. Eligibility

Subjects with measurable disease at Baseline can have objective tumor response evaluated by RECIST criteria. Measurable disease is defined by the presence of at least one measurable lesion. If the measurable disease is restricted to a solitary lesion, its neoplastic nature should be confirmed by cytology/histology if possible.

b. Measurability

TABLE 9

Measurability factors

| | |
|---|---|
| Measurable Lesions | Lesions accurately measured in at least one dimension with a minimum size of: longest diameter ≥ 10 mm (CT scan slice thickness no greater than 5 mm) 10 mm caliper measurement by clinical exam |
| Non-Measurable Lesions | All other lesions, including small lesions (longest diameter < 10 mm) as well as truly non-measurable lesions. Lesions considered truly non-measurable include: leptomeningeal disease, ascites, pleural/pericardial effusion, inflammatory breast disease, lymphangitic involvement of skin or lung and also abdominal masses that are not confirmed and followed by imaging techniques. |

TABLE 9-continued

Measurability factors

| | |
|---|---|
| Measurable Malignant Lymph Nodes | To be considered pathologically enlarged and measurable, a lymph node must be ≥ 15 mm in short axis when assessed by CT scan (CT scan slice thickness recommended to be no greater than 5 mm). At baseline and in follow-up, only the short axis will be measured and followed. |
| Non-Measurable Malignant Lymph Nodes | Pathological lymph nodes with ≥ 10 to < 15 mm short axis. |

All measurements should be taken and recorded in metric notation, using calipers if clinically assessed. All baseline evaluations should be performed as closely as possible to the beginning of treatment and not more than 4 weeks before the beginning of the treatment.

The same method of assessment and the same technique should be used to characterize each identified and reported lesion at Baseline and during follow-up.

Clinical lesions will only be considered measurable when they are superficial (e.g., skin nodules and palpable lymph nodes) and ≥10 mm diameter as assessed using calipers. For the case of skin lesions, documentation by color photography including a ruler to estimate the size of the lesion is recommended.

c. Methods of Measurement

Conventional CT should be performed with cuts of 5 mm or less in slice thickness contiguously. This applies to tumors of the chest and abdomen. A scale should be incorporated into all radiographic measurements.

Cytology and histology can be used to differentiate between partial response (PR) and complete response (CR), when needed in rare cases.

d. Baseline Documentation of "Target" and "Non-Target" Lesions

All measurable lesions up to a maximum of 2 lesions per organ and 5 lesions in total, representative of all involved organs were identified as target lesions and recorded and measured at Baseline. Tumor lesions situated in a previously irradiated area, or in an area subjected to other loco-regional therapy, are usually not considered measurable unless there has been demonstrated progression in the lesion.

Lymph nodes merit special mention since they are normal anatomical structures which may be visible by imaging even if not involved by tumor. Pathological nodes which are defined as measurable and may be identified as target lesions must meet the criterion of a short axis of ≥15 mm by CT scan. Only the short axis of these nodes will contribute to the baseline sum. The short axis of the node is the diameter normally used by radiologists to judge if a node is involved by solid tumor. Nodal size is normally reported as two dimensions in the plane in which the image is obtained (for CT scan this is almost always the axial plane). The smaller of these measures is the short axis. For example, an abdominal node which is reported as being 20 mm×30 mm has a short axis of 20 mm and qualifies as a malignant, measurable node. In this example, 20 mm should be recorded as the node measurement. All other pathological nodes (those with short axis ≥10 mm but <15 mm) should be considered non-target lesions. Nodes that have a short axis <10 mm are considered non-pathological and should not be recorded or followed.

A sum of diameters for all target lesions were calculated and reported as the baseline sum of diameters. If lymph nodes were to be included in the sum, then as noted above, only the short axis were added into the sum. The baseline sum diameters were used as a reference by which to characterize the objective tumor response.

All other lesions (or sites of disease) including pathological lymph nodes should be identified as non-target lesions and should also be recorded at Baseline. Measurements of these lesions are not required, but the presence (stable, increasing or decreasing) or absence of each should be noted throughout follow-up.

e. Evaluation of Target Lesions

Complete Response (CR):

The disappearance of all target lesions. Any pathological lymph nodes (whether target or non-target) must have reduction in short axis to <10 mm.

Partial Response (PR):

At least a 30% decrease in the sum of diameters of target lesions, taking as reference the baseline sum diameters.

Progressive Disease (PD):

At least a 20% increase in the sum of the diameters of target lesions, taking as reference the smallest sum of diameters recorded since the treatment started (baseline or after) or the appearance of one or more new lesions. In addition to the relative increase of 20%, the sum must also demonstrate an absolute increase of at least 5 mm.

Stable Disease (SD):

Neither sufficient shrinkage to qualify for PR nor sufficient increase to qualify for PD, taking as reference the smallest sum of diameters since the treatment started (baseline or after).

Assessment of Target Lesions:

Lymph nodes identified as target lesions should always have the actual short axis measurement recorded (measured in the same anatomical plane as the baseline examination), even if the nodes regress to below 10 mm on study. This means that when lymph nodes are included as target lesions, the 'sum' of lesions may not be zero even if complete response criteria are met, since a normal lymph node is defined as having a short axis of <10 mm. For PR, SD and PD, the actual short axis measurement of the nodes is to be included in the sum of target lesions.

All lesions (nodal and non-nodal) recorded at Baseline should have their actual measurements recorded at each subsequent evaluation, even when very small (<5 mm). However, sometimes target lesions or lymph nodes become too small to measure. If it is in the opinion of the radiologist that the lesion has likely disappeared, the measurement should be recorded as 0 mm. If the lesion is believed to be present, but too small to measure, a default value of 5 mm should be assigned (as derived from the 5 mm CT slice thickness). The measurement of these lesions is potentially non-reproducible; therefore providing this default value will prevent false responses or progression based upon measurement error.

f. Evaluation of Non-Target Lesions

Complete Response (CR):

The disappearance of all non-target lesions and normalization of tumor marker level. All lymph nodes must be non-pathological in size (<10 mm short axis).

Non-CR/Non-PD:

Persistence of one or more non-target lesion(s) and/or maintenance of tumor marker level above the normal limits.

Progressive Disease (PD):

Unequivocal progression of existing non-target lesions.

In this setting, to achieve 'unequivocal progression' on the basis of non-target disease, there must be an overall level of substantial worsening in non-target disease such that, even in the presence of SD or PR in target disease, the overall tumor burden has increased sufficiently to merit discontinuation of therapy. A modest 'increase' in the size of one or more non-target lesions is usually not sufficient to qualify for unequivocal progression status. The designation of overall progression solely on the basis of change in non-target disease in the face of SD or PR of target disease will therefore be extremely rare.

Note: If the subject discontinues treatment for symptomatic deterioration, every effort should be made to document objective progression even after discontinuation of treatment.

New Lesions

The appearance of new malignant lesions denotes disease progression. While there are no specific criteria for the identification of new radiographic lesions, the findings of a new lesion should be unequivocal, i.e., not attributable to differences in scanning technique, timing of scanning, phase of contrast administration, change in imaging modality or finding thought to represent something other than tumor (e.g., some 'new' bone lesions may be simply healing or flare of pre-existing lesions). A lesion identified on a follow-up study in an anatomical location that was not scanned at Baseline is considered a new lesion and will indicate disease progression. An example of this is the subject who has visceral disease at Baseline and while on study has a CT or MRI brain ordered which reveals metastases. The subject's brain metastases are considered evidence of progressive disease even if he/she did not have brain imaging at Baseline.

If a new lesion is equivocal (i.e., too small to measure), continued therapy and follow-up evaluation should clarify if it represents truly new disease. If repeat scans confirm there is a new lesion, then progression should be declared using the date of the initial scan.

7.2.7. Results

As of December 2020, 841 patients were screened with evaluable c-Met IHC data (TABLE 10). c-Met+ rates were generally lower in the EGFR WT (25%) vs EGFR MU (37%) non-squamous cohorts. 39% of patients in the squamous cohort had c-Met+ tumors. FIGS. 8A-8B summarize the observed Overall Response Rate (ORR). FIG. 8A presents results grouped according to both c-Met expression level and EGFR status (WT=wild type, MU=mutated), FIG. 8B presents results grouped only on EGFR status.

TABLE 10

Screening Rates for c-Met Expression by Cohort

|  | Patients | Percentage c-Met+* | Percentage c-Met high | Percentage c-Met int | Percentage of c-Met high within c-Met+ |
|---|---|---|---|---|---|
| Non-Sq EGFR WT NSCLC | 446 | 25 | 12 | 13 | 48 |
| Non-Sq EGFR MU NSCLC | 245 | 37 | 22 | 15 | 59 |
| Sq NSCLC | 150 | 39 | — | — | — |

*The cutoff for c-Met+ is lower for the squamous cohort than the non-squamous cohorts.

EGFR, epidermal growth factor receptor;

int, intermediate;

MU, mutant;

Non-Sq, non-squamous;

NSCLC, non-small cell lung cancer;

Sq, squamous;

WT, wild type.

113 patients with c-Met+ NSCLC were enrolled in Stage 1; 90 patients met efficacy-evaluable criteria and had ≥12 weeks of follow-up (TABLE 11). c-Met expression, based on H-score, was generally lower in the squamous cohort compared with the non-squamous cohorts. In the non-squamous cohorts, a greater frequency of patients with wild type EGFR had intermediate c-Met expression, while a greater frequency of patients with mutated EGFR had high c-Met expression.

Patients in the non-squamous EGFR mutant cohort had a longer median duration of prior systemic cancer therapy than the other two cohorts.

Prior treatment with platinum-based therapies was most common in all cohorts (>80%). The majority of patients in the non-squamous EGFR wild type and squamous cohorts (73% and 91%, respectively) received prior therapy with immune checkpoint inhibitors; all patients in the non-squamous EGFR mutant cohort (100%) received prior therapy with an EGFR TKI.

TABLE 11

Patient Demographics and Clinical Characteristics

| Characteristic | NSQ EGFR WT NSCLC (N = 37) | NSQ EGFR MU NSCLC (N = 31) | SQ NSCLC (N = 22) |
|---|---|---|---|
| Age, median [range] | 66 [33-81] | 58 [36-81] | 67 [45-76] |
| Gender, n (%) | | | |
| Male | 26 (70) | 15 (48) | 12 (55) |
| Female | 11 (30) | 16 (52) | 10 (45) |
| ECOG performance status, n (%) | | | |
| 0 | 7 (19) | 10 (32) | 3 (15) |
| 1 | 29 (78) | 21 (68) | 19 (86) |

TABLE 11-continued

Patient Demographics and Clinical Characteristics

| Characteristic | NSQ EGFR WT NSCLC (N = 37) | NSQ EGFR MU NSCLC (N = 31) | SQ NSCLC (N = 22) |
|---|---|---|---|
| EGFR mutation status, n (%) | | | |
| WT | 37 (100) | 0 | 9 (43) |
| Unknown/unspecified | 0 | 0 | 0 |
| DEL19 | 0 | 12 (39) | 0 |
| L858R | 0 | 10 (32) | 0 |
| T790M | 0 | 6 (19) | 0 |
| Other rare mutations[a] | 0 | 3 (10) | 0 |
| Missing | 0 | 0 | 12 (57) |
| c-MET status | | | |
| H-score, median [range] | 225 [120-300] | 265 [200-300] | 164 [100-285] |
| c-Met expression, n (%) | | | |
| High | 13 (35) | 22 (71) | — |
| Intermediate | 24 (65) | 9 (29) | — |
| MET amplified, n (%) | 2 (5) | 5 (16) | 1 (5) |
| Exon 14 skipping mutation, n (%) Positive | 4 (11) | 0 | 0 |
| Number of prior systemic cancer therapies, median [range] | 2 [1-4] | 2 [1-4] | 2 [1-4] |
| Prior systemic cancer therapies, n (%) | | | |
| Immune checkpoint inhibitors | 27 (73) | 4 (13) | 20 (91) |
| Platinum-based therapies | 35 (95) | 26 (84) | 21 (95) |
| Docetaxel based | 4 (11) | 0 | 1 (5) |
| c-Met inhibitor | 3 (8) | 0 | 0 |
| EGFR TKI | 0 | 31 (100) | 1 (5) |
| 1st/2nd generation | 0 | 27 (87) | 1 (5) |
| 3rd generation | 0 | 12 (39) | 1 (5) |
| Time from initial diagnosis to study entry, weeks, median [range] | 60 [17-216] | 113 [33-483] | 77 [36-466] |
| Duration of last-line anticancer therapy, mos, median [range] | 10 [0-47] | 21 [6-89] | 9 [4-101] |

Includes patients with measurable disease at baseline and ≥ 12 weeks of follow-up.
[a]Mutations include exon 19 deletion (n = 2, 6%) and S768I (n = 1, 3%).
bAs determined by a local laboratory.
ECOG, Eastern Cooperative Oncology Group;
EGFR, epidermal growth factor receptor;
MU, mutant;
Non-Sq, non-squamous;
NSCLC, non-small cell lung cancer;
Sq, squamous;
TKI, tyrosine kinase inhibitor;
WT, wild type.

Efficacy

ORR was 35.1% in the non-squamous EGFR wild type cohort (53.8% in c-Met-high group and 25.0% in c-Met-intermediate group; TABLE 12), but was modest in the non-squamous EGFR mutant and squamous cohorts At the time of this interim analysis, no patients had achieved a complete response, 26/88 (30%) had achieved a partial response, and 9/88 (10%) experienced disease progression.

TABLE 12

Efficacy Endpoints by NSCLC Group

| NSCLC Group | ORR (CR + PR)[a] by ICR, n/N (%) [95% CI] | ORR (CR + PR) by INV, n/N (%) [95% CI] | median DoR by ICR[b], months [95% CI] | median DoR by INV[c], months [95% CI] |
|---|---|---|---|---|
| NSQ EGFR WT | 13/37 (35.1) [20.2, 52.5] | 13/36 (36.1) [20.8, 53.8] | 6.9 [3.8, —] | 5.5 [4.2, 9.6] |
| c-Met high | 7/13 (53.8) [25.1, 80.8] | 6/12 (50.0) [21.1, 78.9] | 6.9 [3.8, —] | 9.0 [8.2, —] |
| c-Met int | 6/24 (25.0) [9.8, 46.7] | 7/24 (29.2) [12.6, 51.1] | 6.6 [4.1, —] | 5.4 [2.7, —] |

TABLE 12-continued

Efficacy Endpoints by NSCLC Group

| NSCLC Group | ORR (CR + PR)[a] by ICR, n/N (%) [95% CI] | ORR (CR + PR) by INV, n/N (%) [95% CI] | median DoR by ICR[b], months [95% CI] | median DoR by INV[c], months [95% CI] |
|---|---|---|---|---|
| NSQ EGFR MU | 4/30 (13.3) [3.8, 30.7] | 8/31 (25.8) [11.9, 44.6] | NA | 5.9 [2.6, —] |
| c-Met high | 4/22 (18.2) [5.2, 40.3] | 8/22 (36.4) [17.2, 59.3] | — | — |
| c-Met int | 0/8 (0) [—, —] | 0/9 (0) [—, —] | — | — |
| SQ | 3/21 (14.3) [3.0, 36.3] | 1/22 (4.5) [0.1, 22.8] | 4.4 [3.0, —] | 5.5 [4.2, 9.6] |

Includes patients with measurable disease at baseline and ≥ 12 weeks of follow-up.
[a]Confirmed CR or PR per RECIST v1.1.
[b]Events occurred in 5/13 responders in the NSQ EGFR WT cohort, 0/4 responders in the NSQ EGFR MU cohort, and 2/3 responders in the SQ cohort.
[c]Events occurred in 8/13 responders in the NSQ EGFR WT cohort, 4/8 responders in the NSQ EGFR MU cohort, and 1/1 responder in the SQ cohort.
CI, confidence interval;
CR, complete response;
ICR, independent central review;
int, intermediate;
INV, investigator;
median (DoR), median duration of response;
MU, mutant;
NSCLC, non-small cell lung cancer;
NSQ, non-squamous;
ORR, objective response rate;
PR, partial response;
RECIST, Response Evaluation Criteria in Solid Tumors;
SQ, squamous;
WT, wild type.

Median progression free survival (PFS) for non-squamous EGFR WT c-Met high was 7.0 months (95% CI: 3.0, 8.3 mos.); for non-squamous EGFR WT c-Met intermediate was 3.9 months (95% CI: 2.6, 5.3 mos.); non-squamous EGFR MU c-Met high was 4.1 months (95% CI: 2.6, — mos.); for non-squamous EGFR MU c-Met intermediate was 3.0 months (95% CI: 1.2, — mos.); and for squamous was 3.1 months (95% CI: 1.6, 5.7 mos.).

Safety

In total, 96% of patients experienced a treatment-emergent adverse event (TEAE), and 72% experienced a TEAE related to Teliso-v as assessed by investigators. TEAEs (any grade) occurring in ≥10% of total patients are summarized in TABLE 13. Grade≥3 TEAEs occurred in 50 (44%) patients The most frequent was malignant neoplasm progression occurring in 6% of patients. The most common serious TEAEs were pneumonia (n=6, 5%), malignant neoplasm progression (n=4, 4%), and pneumonitis (n=4, 4%). Three patients died as a result of a TEAE considered possibly related to teliso-V by investigators (sudden death, dyspnea, pneumonitis, n=1 each)

TABLE 13

Summary of treatment-emergent adverse events by cohort

| TEAEs, n (%) | NSQ EGFR WT NSCLC (N = 47) | NSQ EGFR MU NSCLC (N = 38) | SQ NSCLC (N = 28) |
|---|---|---|---|
| Any | 44 (94) | 37 (97) | 27 (96) |
| Related to study drug[a] | 32 (68) | 33 (87) | 16 (57) |
| Grade ≥ 3 | 24 (51) | 13 (34) | 13 (46) |
| Serious | 19 (40) | 8 (21) | 7 (25) |
| Leading to teliso-v discontinuation | 16 (34) | 8 (21) | 10 (36) |
| Leading to death possibly related to teliso-v[a] | 1 (2) | 0 | 2 (7) |
| Any-grade AEs (≥10% of patients), n (%) | | | |
| Nausea | 10 (21) | 11 (29) | 5 (18) |
| Hypoalbuminemia | 12 (26) | 5 (13) | 5 (18) |

TABLE 13-continued

Summary of treatment-emergent adverse events by cohort

| TEAEs, n (%) | NSQ EGFR WT NSCLC (N = 47) | NSQ EGFR MU NSCLC (N = 38) | SQ NSCLC (N = 28) |
|---|---|---|---|
| Decreased appetite | 9 (19) | 9 (24) | 2 (7) |
| Peripheral edema | 10 (21) | 7 (18) | 3 (11) |
| Peripheral sensory neuropathy | 10 (21) | 8 (21) | 2 (7) |
| Vision blurred | 7 (15) | 7 (18) | 3 (11) |
| Asthenia | 6 (13) | 7 (18) | 3 (11) |
| Gamma-glutamyltransferase increased | 6 (13) | 4 (11) | 6 (21) |
| Keratitis | 4 (9) | 10 (26) | 2 (7) |
| Constipation | 5 (11) | 8 (21) | 2 (7) |
| Fatigue | 4 (9) | 7 (18) | 4 (14) |
| Anemia | 7 (15) | 4 (11) | 3 (11) |
| Alanine aminotransferase increased | 4 (9) | 5 (13) | 3 (11) |
| Diarrhea | 3 (6) | 6 (16) | 3 (11) |
| Dizziness | 4 (9) | 5 (13) | 3 (11) |
| Dyspnoea | 6 (13) | 3 (8) | 3 (11) |
| Grade ≥ 3 AEs (≥3 patients), n (%) | | | |
| Malignant neoplasm progression | 3 (6) | 3 (8) | 1 (4) |
| Pneumonia | 3 (6) | 2 (5) | 1 (4) |
| Hyponatremia | 0 | 1 (3) | 4 (14) |
| Anemia | 2 (4) | 1 (3) | 0 |
| Dyspnoea | 1 (2) | 1 (3) | 1 (4) |
| Fatigue | 1 (2) | 0 | 2 (7) |
| Gamma-glutamyltransferase increased | 0 | 2 (5) | 1 (4) |

TABLE 13-continued

Summary of treatment-emergent adverse events by cohort

| TEAEs, n (%) | NSQ EGFR WT NSCLC (N = 47) | NSQ EGFR MU NSCLC (N = 38) | SQ NSCLC (N = 28) |
|---|---|---|---|
| Peripheral sensory neuropathy | 2 (4) | 0 | 1 (4) |
| Pneumonitis | 1 (2) | 1 (3) | 1 (4) |

[a] As assessed by investigator.
AEs, adverse events;
EGFR, epidermal growth factor receptor;
MU, mutant;
NSCLC, non-small cell lung cancer;
NSQ, non-squamous;
SQ, squamous;
TEAEs, treatment-emergent adverse events;
teliso v, telisotuzumab vedotin;
WT, wild type.

7.3. Discussion

Teliso-V at a dose of 1.9 mg/kg every 2 weeks demonstrated a promising ORR and tolerable safety profile in the non-squamous EGFR WT NSCLC cohort. Based on pre-specified criteria, this cohort has expanded into Stage 2 enrollment. ORR was highest in the c-Met-high group, though also clinically meaningful in the c-Met-intermediate group.

Based on prespecified criteria, enrollment in the squamous cohort was discontinued, while enrollment in the EGFR MU cohort will continue until the next specified interim analysis.

8. EXEMPLARY EMBODIMENTS

While various specific embodiments have been illustrated and described, and some are represented below, it will be appreciated that various changes can be made without departing from the spirit and scope of the inventions(s).

1. A method of treating a non-squamous non-small cell lung cancer ("NSCLC") tumor that expresses c-Met, comprising administering to a human subject having said NSCLC tumor a pharmaceutical composition comprising Teliso-V, an anti-c-Met antibody drug conjugate ("ADC"), wherein the drug conjugate is monomethyl auristatin E ("MMAE"), and the ADC has the following structure:

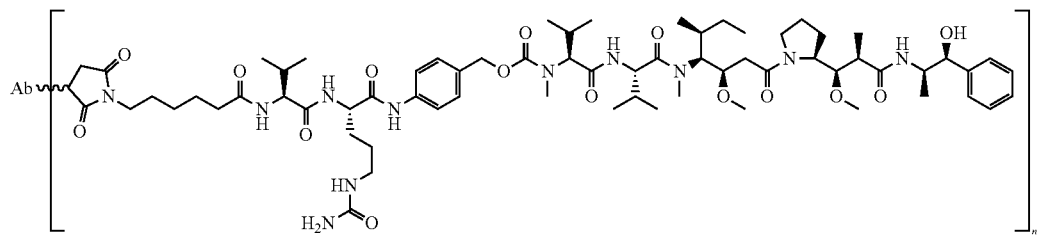

wherein Ab is an IgG antibody consisting of heavy chains each consisting of the amino acid sequence of SEQ ID NO:5 and light chains each consisting of the amino acid sequence of SEQ ID NO:10, n has a value of 2 or 4, and attachment to the Ab is via a thioether linkage formed with a sulfhydryl group of a cysteine residue, and,
wherein ≥25% of neoplastic cells from tumor tissue of the c-Met expressing non-squamous NSCLC from the subject have 3+ membrane or membrane+cytoplasmic staining when assessed by c-Met immunohistochemistry (IHC).

2. The method of embodiment 1, wherein the non-squamous NSCLC tumor does not carry a mutated EGFR gene.

3. The method of embodiment 1, wherein the non-squamous NSCLC tumor carries a mutated EGFR gene.

4. The method of any one of embodiments 1-3, wherein ≥25% to <50% of neoplastic cells from tumor tissue of the c-Met expressing non-squamous NSCLC from the subject have 3+membrane or membrane+cytoplasmic staining when assessed by c-Met IHC.

5. The method of any one of embodiments 1-3, wherein ≥50% of neoplastic cells from tumor tissue the c-Met expressing non-squamous NSCLC from the subject have 3+ membrane or membrane+cytoplasmic staining when assessed by c-Met IHC.

6. The method of any one of embodiments 1-5, wherein administration of Teliso-V achieves an objective response rate (ORR) in the subject that is greater than 25%, greater than 30%, greater than 35%, greater than 40%, greater than 45%, greater than 50%, or greater than 55%.

7. The method of embodiment 6, wherein the ORR has a posterior probability of at least 70%.

8. The method of any one of embodiments 1-7, wherein administration of Teliso-V achieves a median duration of response (DoR) in the subject of at least 6 months, at least 8 months, or at least 10 months.

9. The method of any one of embodiments 1-8, wherein administration of Teliso-V achieves progression free survival (PFS) in the subject of at least 5 months, or at least 5.5 months.

10. The method of any one of embodiments 1-8, wherein administration of Teliso-V achieves an overall survival (OS) in the subject of at least 13 months, or an OS of at least 14 months.

11. The method of any one of embodiments 1-8, wherein administration of Teliso-V achieves a partial response (PR) in the subject.

12. The method of any one of embodiments 1-8, wherein administration of Teliso-V achieves a complete response (CR) in the subject.

13. The method of embodiment 1, wherein the non-squamous NSCLC tumor does not carry a mutated EGFR gene, and wherein administration of Teliso-V achieves an objective response rate (ORR) in the subject that is greater than 25%, preferably greater than 30%, preferably greater than 35%, preferably greater than 40%, wherein the ORR has a posterior probability of at least 70%, optionally wherein administration of Teliso-V achieves a median duration of response (DoR) in the subject of at least 6 months, at least 8 months, or at least 10 months.

14. The method of embodiment 4, wherein the non-squamous NSCLC tumor does not carry a mutated EGFR gene, and wherein administration of Teliso-V achieves an objective response rate (ORR) in the subject that is greater than 25%.

15. The method of embodiment 5, wherein the non-squamous NSCLC tumor does not carry a mutated EGFR gene, and wherein administration of Teliso-V achieves an objective response rate (ORR) in the subject that is greater than 25%, preferably greater than 50%, wherein the ORR has a posterior probability of at least 70%, preferably at least 95%,
optionally wherein administration of Teliso-V achieves a median duration of response (DoR) in the subject that is at least 6 months.

16. The method of any one of embodiments 1-15, wherein the pharmaceutical composition comprising Teliso-V has about a 1:1 ratio of E2 and E4.

17. The method of any one of embodiments 1-16, wherein the pharmaceutical composition comprising Teliso-V has a drug antibody ratio ("DAR") of about 2.6 to about 3.4, or about 2.9 to about 3.1.

18. The method of any one of embodiments 1-17, wherein 1.9 mg/kg of Teliso-V is administered intravenously once every two weeks.

19. The method of any one of embodiments 1-18, wherein 1.9 mg/kg of Teliso-V is administered intravenously once every two weeks to subjects weighing 100 kg or less, and 190 mg is administered intravenously to subjects weighing over 100 kg.

20. The method of any one of embodiments 1-19, wherein the tumor tissue is taken from the subject prior to the administration of the first dose of Teliso-V.

21. The method of any one of embodiments 1-20, wherein the subject has received prior systemic therapy in the locally advanced or metastatic setting.

22. The method of any one of embodiments 1-20, wherein the subject has not received prior systemic therapy in the locally advanced or metastatic setting.

23. The method of any one of embodiments 1-22, wherein the c-Met IHC is performed according to the c-Met Teliso-V Staining Protocol.

24. A method of treating a non-squamous non-small cell lung cancer ("NSCLC") tumor that expresses c-Met in a human subject, comprising the steps of:
  (a) determining whether the tumor exhibits i) c-Met negative expression, ii) c-Met positive expression, iii) c-Met intermediate expression, or iv) c-Met high expression, wherein
    i) c-Met negative expression is defined by <25% of neoplastic cells from tumor tissue of the non-squamous NSCLC having 3+ membrane or membrane+cytoplasmic staining when assessed by IHC;
    ii) c-Met positive expression is defined by ≥25% of neoplastic cells from tumor tissue of the non-squamous NSCLC having 3+ membrane or membrane+cytoplasmic staining when assessed by IHC;
    iii) c-Met intermediate expression is defined by ≥25% to <50% of neoplastic cells from tumor tissue of the non-squamous NSCLC having 3+ membrane or membrane+cytoplasmic staining when assessed by IHC, and
    iv) c-Met high expression is defined by ≥50% of neoplastic cells from tumor tissue of the non-squamous NSCLC having 3+ membrane or membrane+cytoplasmic staining when assessed by IHC, and
  (b) if the tumor tissue exhibits c-Met positive expression, administering to the subject having said non-squamous NSCLC tumor a pharmaceutical composition comprising Teliso-V, an anti-c-Met antibody drug conjugate ("ADC"), wherein the drug conjugate is monomethyl auristatin E ("MMAE"), and the ADC has the following structure:

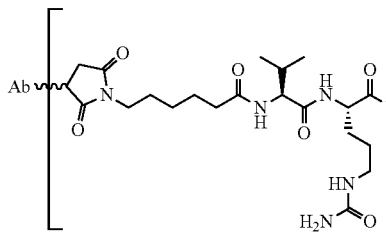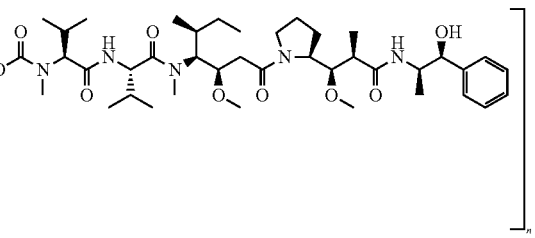

wherein Ab is an IgG antibody consisting of heavy chains each consisting of the amino acid sequence of SEQ ID NO:5 and light chains each consisting of the amino acid sequence of SEQ ID NO:10, n has a value of 2 or 4, and attachment to the Ab is via a thioether linkage formed with a sulfhydryl group of a cysteine residue.

25. The method of embodiment 24, wherein the non-squamous NSCLC tumor does not carry a mutated EGFR gene.

26. The method of embodiment 25, wherein the non-squamous NSCLC tumor carries a mutated EGFR gene.

27. The method of any one of embodiments 24-26, wherein administration of Teliso-V achieves an objective response rate (ORR) in the subject that is greater than 25%, greater than 30%, greater than 35%, greater than 40%, greater than 45%, greater than 50%, or greater than 55%.

28. The method of embodiment 27, wherein the ORR has a posterior probability of at least 70%.

29. The method of any one of embodiments 24-28, wherein administration of Teliso-V achieves a median duration of response (DoR) in the subject of at least 6 months, at least 8 months, or at least 10 months.

30. The method of any one of embodiments 24-29, wherein administration of Teliso-V achieves progression free survival (PFS) in the subject of at least 5 months, or at least 5.5 months.
31. The method of any one of embodiments 24-29, wherein administration of Teliso-V achieves an overall survival (OS) in the subject of at least 13 months, or an OS of at least 14 months.
32. The method of any one of embodiments 24-29, wherein administration of Teliso-V achieves a partial response (PR) in the subject.
33. The method of any one of embodiments 24-29, wherein administration of Teliso-V achieves a complete response (CR) in the subject.
34. The method of embodiment 24, wherein the non-squamous NSCLC tumor does not carry a mutated EGFR gene, and wherein administration of Teliso-V achieves an objective response rate (ORR) in the subject that is greater than 25%, preferably greater than 35%, wherein the ORR has a posterior probability of at least 70%,
optionally wherein administration of Teliso-V achieves a median duration of response (DoR) in the subject of at least 6 months.
35. The method of any one of embodiments 24-34, wherein the pharmaceutical composition comprising Teliso-V has about a 1:1 ratio of E2 and E4.
36. The method of any one of embodiments 24-35, wherein the pharmaceutical composition comprising Teliso-V has a drug antibody ratio ("DAR") of about 2.4 to about 3.6, or about 2.9 to about 3.1.
37. The method of any one of embodiments 24-36, wherein 1.9 mg/kg of Teliso-V is administered intravenously once every two weeks.
38. The method of any one of embodiments 24-37, wherein 1.9 mg/kg of Teliso-V is administered intravenously once every two weeks to subjects weighing 100 kg or less, and 190 mg is administered intravenously to subjects weighing over 100 kg.
39. The method of any one of embodiments 24-38, wherein the tumor tissue taken from the subject prior to administration of the first dose of Teliso-V.
40. The method of any one of embodiments 24-39, wherein the subject has received prior systemic therapy in the locally advanced or metastatic setting.
41. The method of any one of embodiments 24-39, wherein the subject has not received prior systemic therapy in the locally advanced or metastatic setting.
42. The method of any one of embodiments 24-41, wherein the c-Met IHC is performed according to the c-Met Teliso-V Staining Protocol.
43. A method of treating a non-squamous non-small cell lung cancer ("NSCLC") tumor that expresses c-Met in a human subject, comprising the steps of:

(a) determining whether the tumor exhibits: i) c-Met negative expression, i) c-Met positive expression, iii) c-Met intermediate expression, or iv) c-Met high expression, wherein
  i) c-Met negative expression is defined by <25% of the neoplastic cells from tumor tissue of the non-squamous NSCLC having 3+ membrane or membrane+cytoplasmic staining when assessed by IHC;
  ii) c-Met positive expression is defined by ≥25% of the neoplastic cells from tumor tissue of the non-squamous NSCLC having 3+ membrane or membrane+cytoplasmic staining when assessed by IHC;
  iii) c-Met intermediate expression is defined by ≥25% to <50% of the neoplastic cells from tumor tissue of the non-squamous NSCLC having 3+ membrane or membrane+cytoplasmic staining when assessed by IHC, and
  iv) c-Met high expression is defined by ≥50% of the neoplastic cells from tumor tissue of the non-squamous NSCLC having 3+ membrane or membrane+cytoplasmic staining when assessed by IHC, and
(b) if the tumor tissue exhibits c-Met intermediate expression, administering to the subject having said non-squamous NSCLC tumor a pharmaceutical composition comprising Teliso-V, an anti-c-Met antibody drug conjugate ("ADC"), wherein the drug conjugate is monomethyl auristatin E ("MMAE"), and the ADC has the following structure:

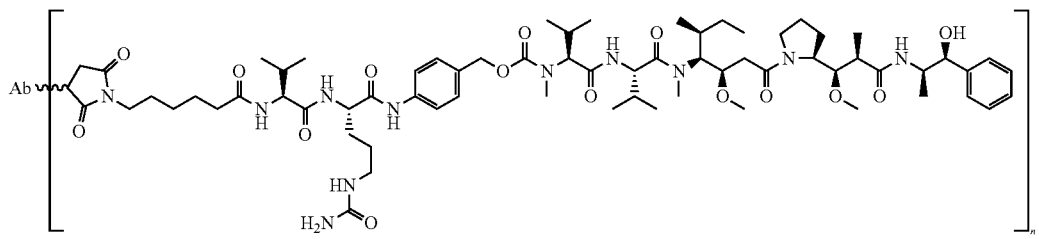

wherein Ab is an IgG antibody consisting of heavy chains each consisting of the amino acid sequence of SEQ ID NO:5 and light chains each consisting of the amino acid sequence of SEQ ID NO:10, n has a value of 2 or 4, and attachment to the Ab is via a thioether linkage formed with a sulfhydryl group of a cysteine residue.
44. The method of embodiment 43, wherein the non-squamous NSCLC tumor does not carry a mutated EGFR gene.
45. The method of embodiment 43, wherein the non-squamous NSCLC tumor carries a mutated EGFR gene.
46. The method of any one of embodiments 43-45, wherein administration of Teliso-V achieves an objective response rate (ORR) in the subject that is greater than 25%, greater than 30%, greater than 35%, greater than 40%, greater than 45%, greater than 50%, or greater than 55%.
47. The method of embodiment 46, wherein the ORR has a posterior probability of at least 70%.
48. The method of any one of embodiments 43-47, wherein administration of Teliso-V achieves a median duration of response (DoR) in the subject of at least 6 months, at least 8 months, or at least 10 months.

49. The method of any one of embodiments 43-48, wherein administration of Teliso-V achieves progression free survival (PFS) in the subject of at least 5 months, or at least 5.5 months.
50. The method of any one of embodiments 43-48, wherein administration of Teliso-V achieves an overall survival (OS) in the subject of at least 13 months, or an OS of at least 14 months.
51. The method of any one of embodiments 43-48, wherein administration of Teliso-V achieves a partial response (PR) in the subject.
52. The method of any one of embodiments 43-48, wherein administration of Teliso-V achieves a complete response (CR) in the subject.
53. The method of embodiment 43, wherein the non-squamous NSCLC tumor does not carry a mutated EGFR gene, and wherein administration of Teliso-V achieves an objective response rate (ORR) in the subject that is greater than 25%.
54. The method of any one of embodiments 43-53, wherein the pharmaceutical composition comprising Teliso-V has about a 1:1 ratio of E2 and E4.
55. The method of any one of embodiments 43-54, wherein the pharmaceutical composition comprising Teliso-V has a drug antibody ratio ("DAR") of about 2.4 to about 3.6, or about 2.9 to about 3.1.
56. The method of any one of embodiments 43-55, wherein 1.9 mg/kg of Teliso-V is administered intravenously once every two weeks.
57. The method of any one of embodiments 43-56, wherein 1.9 mg/kg of Teliso-V is administered intravenously once every two weeks to subjects weighing 100 kg or less, and 190 mg is administered intravenously to subjects weighing over 100 kg.
58. The method of any one of embodiments 43-57, wherein the tumor tissue is taken from the subject prior to administration of the first dose of Teliso-V.
59. The method of any one of embodiments 43-58, wherein the subject has received prior systemic therapy in the locally advanced or metastatic setting.
60. The method of any one of embodiments 43-58, wherein the subject has not received prior systemic therapy in the locally advanced or metastatic setting.
61. The method of any one of embodiments 43-60, wherein the c-Met IHC is performed according to the c-Met Teliso-V Staining Protocol.
62. A method of treating a non-squamous non-small cell lung cancer ("NSCLC") tumor that expresses c-Met in a human subject, comprising the steps of:
  (a) determining whether the tumor exhibits: i) c-Met negative expression, ii) c-Met positive expression, iii) c-Met intermediate expression, or iv) c-Met high expression, wherein
    i) c-Met negative expression is defined by <25% of the neoplastic cells from tumor tissue of the non-squamous NSCLC having 3+ membrane or membrane+cytoplasmic staining when assessed by IHC;
    ii) c-Met positive expression is defined by ≥25% of the neoplastic cells from tumor tissue of the non-squamous NSCLC having 3+ membrane or membrane+cytoplasmic staining when assessed by IHC;
    iii) c-Met intermediate expression is defined by ≥25% to <50% of the neoplastic cells from tumor tissue of the non-squamous NSCLC having 3+ membrane or membrane+cytoplasmic staining when assessed by IHC, and
    iv) c-Met high expression is defined by ≥50% of the neoplastic cells from tumor tissue of the non-squamous NSCLC having 3+ membrane or membrane+cytoplasmic staining when assessed by IHC, and
  (b) if the tumor tissue exhibits c-Met high expression, administering to the subject having said non-squamous NSCLC tumor a pharmaceutical composition comprising Teliso-V, an anti-c-Met antibody drug conjugate ("ADC"), wherein the drug conjugate is monomethyl auristatin E ("MMAE"), and the ADC has the following structure:

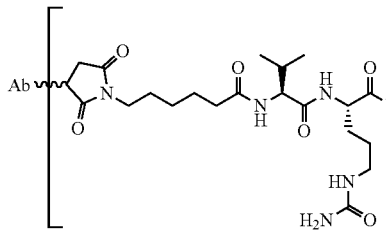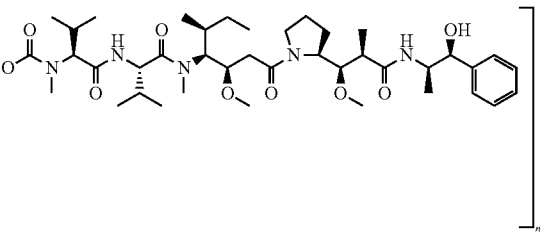

wherein Ab is an IgG antibody consisting of heavy chains each consisting of the amino acid sequence of SEQ ID NO:5 and light chains each consisting of the amino acid sequence of SEQ ID NO:10, n has a value of 2 or 4, and attachment to the Ab is via a thioether linkage formed with a sulfhydryl group of a cysteine residue.
63. The method of embodiment 62, wherein the non-squamous NSCLC tumor does not carry a mutated EGFR gene.
64. The method of embodiment 62, wherein the non-squamous NSCLC tumor carries a mutated EGFR gene.
65. The method of any one of embodiments 62-64, wherein administration of Teliso-V achieves an objective response rate (ORR) in the subject that is greater than 25%, greater than 30%, greater than 35%, greater than 40%, greater than 45%, greater than 50%, or greater than 55%.
66. The method of embodiment 65, wherein the ORR has a posterior probability of at least 70%.
67. The method of any one of embodiments 62-66, wherein administration of Teliso-V achieves a median duration of response (DoR) in the subject of at least 6 months, at least 8 months, or at least 10 months.
68. The method of any one of embodiments 62-67, wherein administration of Teliso-V achieves progression free survival (PFS) in the subject of at least 5 months, or at least 5.5 months.
69. The method of any one of embodiments 62-68, wherein administration of Teliso-V achieves an overall survival (OS) in the subject of at least 13 months, or an OS of at least 14 months.
70. The method of any one of embodiments 62-69, wherein administration of Teliso-V achieves a partial response (PR) in the subject.
71. The method of any one of embodiments 62-70, wherein administration of Teliso-Vachieves a complete response (CR) in the subject.
72. The method of embodiment 62, wherein the NSCLC tumor does not carry a mutated EGFR gene, and wherein administration of Teliso-Vachieves an objective response rate (ORR) in the subject that is greater than 25%, preferably greater than 50%, wherein the ORR has a posterior probability of at least 70%, preferably at least 95%,
optionally wherein administration of Teliso-V achieves a median duration of response (DoR) in the subject of at least 6 months.
73. The method of any one of embodiments 62-72, wherein the pharmaceutical composition comprising Teliso-V has about a 1:1 ratio of E2 and E4.
74. The method of any one of embodiments 62-73, wherein the pharmaceutical composition comprising Teliso-V has a drug antibody ratio ("DAR") of about 2.4 to about 3.6.
75. The method of any one of embodiments 62-74, wherein 1.9 mg/kg of Teliso-V is administered intravenously once every two weeks.
76. The method of any one of embodiments 62-75, wherein 1.9 mg/kg of Teliso-Vis administered intravenously once every two weeks to subjects weighing 100 kg or less, and 190 mg is administered intravenously to subjects weighing over 100 kg.
77. The method of any one of embodiments 62-76, wherein the tissue sample is taken from the subject prior to administration of the first dose of Teliso-V.
78. The method of any one of embodiments 62-77, wherein the subject has received prior systemic therapy in the locally advanced or metastatic setting.
79. The method of any one of embodiments 62-78, wherein the subject has not received prior systemic therapy in the locally advanced or metastatic setting.
80. The method of any one of embodiments 62-79, wherein the c-Met IHC is performed according to the c-Met Teliso-V Staining Protocol.
81. A method of treating non-squamous non-small cell lung cancer ("NSCLC") tumors that express c-Met in a plurality of human subjects, comprising the steps of:
  (a) determining whether the tumor exhibits: i) c-Met negative expression, ii) c-Met positive expression, iii) c-Met intermediate expression, or iv) c-Met high expression, wherein
    i) c-Met negative expression is defined by <25% of the neoplastic cells from tumor tissue of the non-squamous NSCLC having 3+ membrane or membrane+cytoplasmic staining when assessed by IHC;
    ii) c-Met positive expression is defined by ≥25% of the neoplastic cells from tumor tissue of the non-squamous NSCLC having 3+ membrane or membrane+cytoplasmic staining when assessed by IHC;
    iii) c-Met intermediate expression is defined by ≥25% to <50% of the neoplastic cells from tumor tissue of the non-squamous NSCLC having 3+ membrane or membrane+cytoplasmic staining when assessed by IHC, and
    iv) c-Met high expression is defined by ≥50% of the neoplastic cells from tumor tissue of the non-squamous NSCLC having 3+ membrane or membrane+cytoplasmic staining when assessed by IHC,
  (b) if the tumor tissue exhibits c-Met negative expression, excluding the subject having the non-squamous NSCLC tumor with c-Met negative expression from treatment;
  (c) if the tumor tissue exhibits c-Met high expression, selecting the subject for treatment and administering to the selected subject a pharmaceutical composition comprising Teliso-V, an anti-c-Met antibody drug conjugate ("ADC"), wherein the drug conjugate is monomethyl auristatin E ("MMAE"), and the ADC has the following structure:

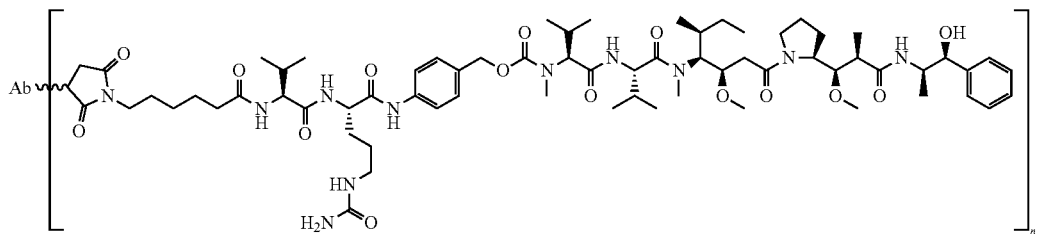

wherein Ab is an IgG antibody consisting of heavy chains each consisting of the amino acid sequence of SEQ ID NO:5 and light chains each consisting of the amino acid sequence of SEQ ID NO:10, n has a value of 2 or 4, and attachment to the Ab is via a thioether linkage formed with a sulfhydryl group of a cysteine residue.
82. The method of embodiment 81, wherein step b) further comprises the step of: if the tumor tissue exhibits c-Met positive expression, excluding the subject having the non-squamous NSCLC tumor with c-Met positive expression from treatment.
83. The method of embodiment 81 or 82, wherein step b) further comprises the step of: if the tumor tissue exhibits c-Met intermediate expression, excluding the subject having the non-squamous NSCLC tumor with c-Met intermediate expression from treatment.
84. The method of any one of embodiments 81-83, wherein the non-squamous NSCLC tumor does not carry a mutated EGFR gene.

85. The method of any one of embodiments 81-83, wherein the NSCLC tumor carries a mutated EGFR gene.
86. The method of any one of embodiments 81-85, wherein administration of Teliso-V achieves an objective response rate (ORR) in the selected subject that is greater than 25%, greater than 30%, greater than 35%, greater than 40%, greater than 45%, greater than 50%, or greater than 55%.
87. The method of embodiment 86, wherein the ORR has a posterior probability of at least 70%.
88. The method of any one of embodiments 81-87, wherein administration of Teliso-V achieves a median duration of response (DoR) in the selected subject of at least 6 months, at least 8 months, or at least 10 months.
89. The method of any one of embodiments 81-88, wherein administration of Teliso-V achieves progression free survival (PFS) in the subject of at least 5 months, or at least 5.5 months.
90. The method of any one of embodiments 81-88, wherein administration of Teliso-V achieves an overall survival (OS) in the subject of at least 13 months, or an OS of at least 14 months.
91. The method of any one of embodiments 81-88, wherein administration of Teliso-V achieves a partial response (PR) in the subject.
92. The method of any one of embodiments 81-88, wherein administration of Teliso-V achieves a complete response (CR) in the subject.
93. The method of any one of embodiments 81-83, wherein the NSCLC tumor does not carry a mutated EGFR gene, and wherein administration of Teliso-V achieves an objective response rate (ORR) in the selected subject that is greater than 25%, preferably greater than 50%, wherein the ORR has a posterior probability of at least 70%, preferably at least 95%, optionally wherein administration of Teliso-V achieves a median duration of response (DoR) in the subject of at least 6 months.
94. The method of any one of embodiments 81-93, wherein the pharmaceutical composition comprising Teliso-V has about a 1:1 ratio of E2 and E4.
95. The method of any one of embodiments 81-94, wherein the pharmaceutical composition comprising Teliso-V has a drug antibody ratio ("DAR") of about 2.6 to about 3.4, or about 2.9 to about 3.1.
96. The method of any one of embodiments 81-95, wherein 1.9 mg/kg of Teliso-V is administered intravenously once every two weeks.
97. The method of any one of embodiments 81-96, wherein 1.9 mg/kg of Teliso-V is administered intravenously once every two weeks to subjects weighing 100 kg or less, and 190 mg is administered intravenously to subjects weighing over 100 kg.
98. The method of any one of embodiments 81-97, wherein the tumor tissue is taken from the subject prior to administration of the first dose of Teliso-V.
99. The method of any one of embodiments 81-98, wherein the subject has received prior systemic therapy in the locally advanced or metastatic setting.
100. The method of any one of embodiments 81-98, wherein the subject has not received prior systemic therapy in the locally advanced or metastatic setting.
101. The method of any one of embodiments 81-100, wherein the c-MetT IHC is performed according to the c-Met Teliso-V Staining Protocol.
102. The method of any one of embodiments 1-17, 20-36, 39-55, 58-74, 77-95, 98-101, wherein 1.6 mg/kg of Teliso-V is administered intravenously once every two weeks.
103. The method of embodiment 102, wherein the subject achieves a partial response or a complete response.
104. The method of any one of embodiments 18, 19, 37, 38, 56, 57, 75, 76, 96, 97, wherein the subject achieves a partial response or a complete response.
105. The method of any one of embodiments 1-104, wherein 1.2 to 2.4 mg/kg of Teliso-V is administered intravenously once every two weeks, wherein the subject achieves a partial response or a complete response.

What is claimed:

1. A method of treating non-squamous non-small cell lung cancer ("NSCLC") tumors that express c-Met in a plurality of human subjects, comprising the steps of:
   (a) determining or having determined whether the tumors exhibit c-Met high expression, wherein c-Met high expression is defined by ≥50% of the neoplastic cells from tumor tissue of the non-squamous NSCLC having 3+ membrane or membrane+cytoplasmic staining if assessed by the c-Met Teliso-V Staining Protocol;
   (b) if the tumor tissue does not exhibit c-Met high expression, excluding the subject having the tumor that does not exhibit c-Met high expression from treatment;
   (c) if the tumor tissue exhibits c-Met high expression, selecting the subject for treatment and intravenously administering 1.6 mg/kg or 1.9 mg/kg of telisotuzumab vedotin once every two weeks (Q2W) to the selected subject, wherein the non-squamous NSCLC tumor does not carry a mutated EGFR gene.

2. A method of treating non-squamous non-small cell lung cancer ("NSCLC") tumors that do not carry a mutated EGFR gene and express c-Met in a plurality of human subjects having NSCLC, comprising for each subject from the plurality of human subjects with NSCLC the steps of:
   (a) selecting for treatment the subject with a tumor that is i) non-squamous, and ii) does not harbor a mutated EGFR gene, and iii) exhibits c-Met positive expression; and excluding from treatment the subject if the subject has a tumor that meets any one of the following criteria: i) is squamous, ii) harbors a mutated EGFR gene, or iii) does not exhibit c-Met positive expression; and
   (b) if the subject is selected for treatment, treating the selected subject by intravenously administering 1.6 mg/kg or 1.9 mg/kg of telisotuzumab vedotin once every two weeks (Q2W) to the selected subject,
   wherein c-Met positive expression is defined by ≥25% of the neoplastic cells from tumor tissue of the non-squamous NSCLC having 3+ membrane or membrane+cytoplasmic staining if assessed by the c-Met Teliso-V Staining Protocol.

3. A method of treating non-squamous non-small cell lung cancer ("NSCLC") tumors that do not carry a mutated EGFR gene and express c-Met in a plurality of human subjects having NSCLC, comprising for each subject from the plurality of human subjects with NSCLC the steps of:
   (a) selecting for treatment the subject with a tumor that is i) non-squamous, and ii) does not harbor a mutated EGFR gene, and iii) exhibits c-Met positive expression; and excluding from treatment the subject if the subject has a tumor that meets any one of the following criteria: i) is squamous, ii) harbors a mutated EGFR gene, or iii) does not exhibit c-Met positive expression; and
   (b) if the subject is selected for treatment, treating the selected subject by intravenously administering 1.6 mg/kg or 1.9 mg/kg of telisotuzumab vedotin once every two weeks (Q2W) to the selected subject,
   wherein c-Met positive expression is defined by ≥50% of the neoplastic cells from tumor tissue of the non-squamous NSCLC having 3+ membrane or membrane+cytoplasmic staining if assessed by the c-Met Teliso-V Staining Protocol.

* * * * *